(12) United States Patent
Ciasulli et al.

(10) Patent No.: US 12,487,108 B2
(45) Date of Patent: Dec. 2, 2025

(54) CALIBRATED FLOW RATE SENSING AND FLOW CONTROL DEVICE

(71) Applicant: Victaulic Company, Easton, PA (US)

(72) Inventors: Andrew Michael Ciasulli, Nazareth, PA (US); Stephen Joseph Meyer, Chester Springs, PA (US); Kristopher Lawrence Desrochers, Cincinnati, OH (US); Neal A. Clevenger, Nazareth, PA (US); Lawrence R. Carmen, Jr., Bath, PA (US)

(73) Assignee: VICTAULIC COMPANY, Easton, PA (US)

( * ) Notice: Subject to any disclaimer, the term of this patent is extended or adjusted under 35 U.S.C. 154(b) by 350 days.

(21) Appl. No.: 17/837,088

(22) Filed: Jun. 10, 2022

(65) Prior Publication Data

US 2022/0404183 A1 Dec. 22, 2022

Related U.S. Application Data

(60) Provisional application No. 63/212,209, filed on Jun. 18, 2021.

(51) Int. Cl.
| | |
|---|---|
| *A62C 35/68* | (2006.01) |
| *F16K 1/20* | (2006.01) |
| *F16K 37/00* | (2006.01) |
| *G01F 1/20* | (2006.01) |
| *G01F 15/00* | (2006.01) |
| *G01F 25/10* | (2022.01) |

(52) U.S. Cl.
CPC ................ *G01F 1/20* (2013.01); *A62C 35/68* (2013.01); *F16K 1/2071* (2013.01); *F16K 37/00* (2013.01); *F16K 37/0033* (2013.01); *G01F 15/005* (2013.01); *G01F 25/10* (2022.01)

(58) Field of Classification Search
CPC .. F16K 37/0033; F16K 15/025; F16K 15/026; F16K 15/028; F16K 15/033; A62C 35/68
See application file for complete search history.

(56) References Cited

U.S. PATENT DOCUMENTS 2,001,941 A * 5/1935 Rowe .................... F16K 15/034
  137/527
3,358,709 A * 12/1967 Thresher ................. F16K 15/03
  251/303

(Continued)

FOREIGN PATENT DOCUMENTS

| CN | 103115184 A | 5/2013 |
| CN | 105673896 | 6/2016 |

(Continued)

*Primary Examiner* — Herbert K Roberts
(74) *Attorney, Agent, or Firm* — Ballard Spahr LLP

(57) ABSTRACT

A fluid flow rate sensor, which may also be the basis of a valve for a fire suppression system, uses a sensing arm to convey motion of an obturation body or a valve closing member to a sensor system which evaluates the motion and generates a calibrated measure of the flow rate and/or an alarm signal in response if warranted. The obturation body and the valve closing member are capable of both rotation and translational motion, both of which are sensed using the sensing arm. The sensor system is isolated from the fluid within the valve.

33 Claims, 16 Drawing Sheets

(56) References Cited

U.S. PATENT DOCUMENTS

| | | | |
|---|---|---|---|
| 3,478,778 A * | 11/1969 | Clarkson | E03C 1/106 |
| | | | 137/530 |
| 3,587,746 A | 6/1971 | Venison et al. | |
| 4,321,942 A * | 3/1982 | Duggan | F16K 15/03 |
| | | | 137/107 |
| 4,397,195 A | 8/1983 | Hayward | |
| 5,046,525 A * | 9/1991 | Powell | E03C 1/106 |
| | | | 137/527 |
| 5,063,775 A * | 11/1991 | Walker, Sr. | E21B 47/009 |
| | | | 73/152.52 |
| 5,429,003 A | 7/1995 | McFarland | |
| 6,152,173 A * | 11/2000 | Makowan | F16K 15/03 |
| | | | 137/553 |
| 6,443,181 B1 * | 9/2002 | Powell | F16K 15/033 |
| | | | 137/315.16 |
| 6,968,852 B1 * | 11/2005 | Sibley | F16K 37/0033 |
| | | | 251/303 |
| 7,152,622 B2 * | 12/2006 | Scaramucci | F16K 15/033 |
| | | | 137/527.2 |
| 7,249,611 B2 | 7/2007 | Scaramucci et al. | |
| 8,511,338 B2 | 8/2013 | Karihara | |
| 8,800,473 B1 | 8/2014 | DeVerse et al. | |
| 10,197,172 B2 * | 2/2019 | Fuller | F16K 27/0227 |
| 10,753,490 B2 | 8/2020 | Fuller et al. | |
| 10,765,899 B2 | 9/2020 | Pohl et al. | |
| 10,773,113 B2 | 9/2020 | Pohl | |
| 2001/0020901 A1 * | 9/2001 | McHugh | A62C 35/605 |
| | | | 340/506 |
| 2012/0001111 A1 * | 1/2012 | Takeda | F16K 37/0041 |
| | | | 251/231 |
| 2015/0260310 A1 | 9/2015 | Bahalul | |
| 2016/0327163 A1 * | 11/2016 | Diaz | F16K 15/035 |
| 2018/0202350 A1 * | 7/2018 | Niekamp | F02D 9/106 |
| 2019/0277672 A1 | 9/2019 | van Beurden | |
| 2019/0383414 A1 | 12/2019 | Brown et al. | |

FOREIGN PATENT DOCUMENTS

| | | | | |
|---|---|---|---|---|
| CN | 110284558 A | | 9/2019 | |
| JP | 09-072441 | | 3/1997 | |
| JP | 2005054654 A | * | 3/2005 | F02D 9/105 |
| JP | 2006055400 A | | 3/2006 | |
| JP | 2007285992 A | | 11/2007 | |
| JP | 4796897 B2 | | 10/2011 | |
| JP | 2012011041 A | | 1/2012 | |
| JP | 2012217777 | | 11/2012 | |
| JP | 2014188092 A | | 10/2014 | |
| JP | 2015119894 A | | 7/2015 | |
| JP | 2018033866 A | | 3/2018 | |
| KR | 100898698 | | 5/2009 | |
| KR | 100898698 B1 | * | 5/2009 | |
| KR | 20120012357 | | 2/2012 | |
| KR | 101335882 | | 12/2013 | |
| KR | 20170016048 | | 2/2017 | |
| KR | 20170016048 A | * | 2/2017 | |
| TW | 200300204 A | | 5/2003 | |
| TW | 201915371 A | | 4/2019 | |
| TW | 201928106 A | | 7/2019 | |
| WO | 2020075311 A1 | | 4/2020 | |

* cited by examiner

CALIBRATED FLOW RATE SENSING AND FLOW CONTROL DEVICE

CROSS REFERENCE TO RELATED APPLICATIONS

This application is based upon and claims benefit of priority to U.S. Provisional Application No. 63/212,209, filed Jun. 18, 2021 and hereby incorporated by reference herein.

FIELD OF THE INVENTION

This invention relates to flow rate sensors for measuring fluid flow and valves for controlling fluid flow.

BACKGROUND

Flow rate sensors according to the prior art are limited in their sensitivity at low flow rates, especially low flow rates through relatively large diameter pipe elements. There is an opportunity to improve the accuracy and sensitivity of flow rate sensors.

Check valves, especially those used in fire suppression systems to maintain water or gases in the piping network of the system and allow flow of water from a pressurized source to the system when one or more sprinklers open in response to a fire. Check valves are frequently required, by local and national building codes, to be used in association with a flow sensor which can initiate an alarm, for example, an audible alarm at the site of the fire and an electronic communication signal to a local fire department advising that a fire has occurred at a specific location. Practical designs for such check valves, especially swing clapper-type check valves, often employ a valve element that has a limited range of unconstrained or "lost" motion, in order that the valve does not leak due to the complexities of ensuring that the plane of the clapper seal is always aligned with the plane of the clapper seat under all manufacturing tolerance conditions, testing conditions, operational conditions in order to naturally form a good seal under varying practical conditions.

Check valves according to the prior art, especially those used in systems which maintain water downstream of the check valve, are often installed adjacent to flow switches, in the form of paddles, within the flow stream that flows through the valve, as the unpredictable lost motion of the valve element does not lend itself to repeatable use of the valve element as an indicator for flow. Further, codes and standards governing the certification of such flow switches for use, such as those provided by UL, require that the flow switches must not activate below a certain flow threshold, commonly four gallons per minute (GPM), but must not fail to activate below 10 GPM. In order to meet this requirement across the range of common sizes of pipe in which such flow switches and check valves are installed, switches having mating paddles for each size of pipe are employed. The position of the paddles in response to flow through the valve within the regulatory-imposed criteria triggers a micro switch to initiate the alarm. However, such systems are delicate, cannot withstand large flow rates or high pressure flows, and thus limit the rate at which water can fill the piping network volume. The paddles also cause increased resistance to flow and measurable pressure head loss through the pipe. Because the paddles are within the flow stream and mechanically connected to the dedicated external control box housing the micro switch, it is necessary to drain the entire system to effect adjustment, repair or replacement. Where such check valves are installed in systems which have pressurized air or other gases downstream of the check valve, regulations prohibit the use of paddle flow switches. Check valves in such systems, commonly called, dry, pre-action, or deluge systems, are made significantly more complicated by the inability to use paddle flow switches, instead using an intermediate chamber between the pressurized water supply upstream of the check valve and the pressurized air or gas in the system downstream of the check valve. This intermediate chamber is connected to a separate water flow pressure switch used to monitor for opening of the check valve by detecting pressure increase in the intermediate chamber due to opening of the check valve. There is clearly an opportunity to improve check valves and the systems in which they are installed, including check valves used in fire protection systems.

SUMMARY

In one aspect, the invention concerns a flow rate sensor. In one example embodiment, the flow rate sensor comprises a housing having an inlet and an outlet. The housing defines a flow path between the inlet and the outlet. A shaft is rotatably mounted within the housing. An obturation body is positioned within the housing between the inlet and the outlet. The obturation body is mounted on the shaft and movable relatively thereto and relatively to the housing in response to fluid flow between the inlet and the outlet. A sensing arm has a first end fixedly mounted on the shaft and a second end engaging the obturation body. A sensor system adapted to sense rotation of the shaft relatively to the housing is further part of the example embodiment.

By way of example, the obturation body comprises a disk oriented transversely to the flow path. In an example embodiment, the obturation body may further comprise at least one lug extending between the disk and the shaft. The lug defines a hole receiving the shaft. The hole is sized to permit rotational and translational motion of the disk relatively to the shaft. An example flow rate sensor may further comprise a seat surrounding the inlet. The obturation body is engageable with the seat. A spring acts between the obturation body and the housing, or a projection extending from the sensor system into the housing, for biasing the obturation body into engagement with the seat. An example embodiment may comprise a projection extending from the sensor system into the housing wherein the spring acts between the projection and the sensing arm. The projection may have an eccentric cross section.

An example flow rate sensor according to the invention may comprise a seal positioned between and mounted on one of the seat or the obturation body. Further by way of example, a weight may be mounted on the sensing arm distal to the shaft. A link may extend between the sensing arm and the obturation body. The link is positioned distal to the shaft for flexibly connecting the sensing arm to the obturation body.

In an example embodiment an actuator may be used for moving the sensing arm. In one example the actuator comprises a push rod having a first end extending from the housing and a second end engageable with the sensing arm proximate to the shaft, the push rod defining a line of action eccentric to the shaft thereby enabling a force applied to the push rod to rotate the sensing arm about the shaft. The actuator may further comprise a solenoid adapted to move the push rod. In another example embodiment the actuator comprises an axle having a first end projecting from the housing and a second end positioned within the housing proximate to the shaft. A cam is mounted on the second end of the axle. The cam is rotatable into and out of engagement with the sensing arm upon rotation of the axle to effect rotation of the sensing arm and the shaft. Further by way of example, an electric motor may be engaged with the axle and adapted to rotate the axle for rotating the cam.

In another example embodiment, the actuator comprises a lever arm attached to the first end of the axle. The lever arm extending transversely to the axle. A solenoid engages the lever arm and is adapted to move the lever arm and thereby rotating the axle.

An example flow rate sensor may comprise a magnet fixedly mounted on the shaft. The magnet is positioned proximate to the sensor system. In an example embodiment the magnet is positioned within the housing. In a particular example, the magnet is mounted on an end of the shaft. The magnet is surrounded by a non-magnetic sheath projecting from the housing in an example, the sensor system being positioned on an exterior of the housing. The sensor system may comprise a non-contact sensor, for example, a sensor selected from the group consisting of magnetic sensors, Hall effect sensors and capacitive sensors. In an example embodiment the sensor system comprises a magnetic position sensor. By way of example, the sensor system may further comprise a controller in communication with the magnetic position sensor. In another example, the sensor system comprises an adjustable delay circuit in communication with the controller for delaying communication of an alarm signal from the controller.

In another aspect, the invention concerns a valve. In an example embodiment the valve comprises a housing having an inlet and an outlet. A seat surrounds the inlet. A shaft is rotatably mounted within the housing. A valve closing member is positioned within the housing and sealingly engageable with the seat. The valve closing member is mounted on the shaft and movable relatively thereto between an open position, allowing flow from the inlet to the outlet, and a closed position preventing reversal of the flow. A sensing arm has a first end fixedly mounted on the shaft and a second end portion engaging the valve closing member. A spring acts to bias the sensing arm into contact with the valve closing member. A sensor system is adapted to sense rotation of the shaft relatively to the housing.

In an example embodiment the spring acts between the housing and the sensing arm. Another example comprises a projection extending from the sensor system into the housing. The spring acts between the projection and the sensing arm. The spring acts to bias the valve closing member into the closed position. By way of example, the sensor system may be mounted on the housing. The projection may have an eccentric cross section.

In an example embodiment the sensing arm comprises a first projection extending from the second end portion and a second projection extending from the second end and in spaced relation to the first projection. The first and second projections engage the valve closing member. In an example embodiment the first and second projections are aligned along a line oriented parallel to the shaft.

In an example embodiment the valve closing member comprises a disk sealingly engageable with the seat. A first lug projects from the disk. The first lug defines a first opening receiving the shaft. A second lug projects from the disk. The second lug is arranged in spaced relation to the first lug and defines a second opening receiving the shaft. The disk is rotatable about the shaft relatively thereto. In an example embodiment the first and second openings comprise respective first and second slots. The first and second slots are oriented relatively to the disk so as to permit translational motion of the disk toward and away from the seat.

In an example embodiment the sensing arm comprises a first projection extending from the second end portion and a second projection extending from the second end portion positioned in spaced relation to the first projection. The first and second projections engage the valve closing member. By way of example the first and second projections are aligned along a line oriented parallel to the shaft. The first projection engages the disk on one side of a diametral line of the disk and the second projection engages the disk on an opposite side of the diametral line. The diametral line is oriented perpendicularly to the shaft. In a further example the second end portion of the sensing arm extends in a direction parallel to the shaft and the first and second projections engage the disk at first and second points proximate to a center of the disk. The first and second points may be located over center of the disk relatively to the shaft.

In an example embodiment a magnet is fixedly mounted on the shaft. The magnet is positioned proximate to the sensor system. By way of example the magnet is positioned within the housing and may be mounted on an end of the shaft. In an example embodiment the magnet is surrounded by a non-magnetic sheath projecting from the housing. By way of example the sensor system may be positioned on an exterior of the housing.

In an example embodiment the sensor system comprises a non-contact sensor. For example, the sensor system may comprises a sensor selected from the group consisting of magnetic sensors, Hall effect sensors and capacitive sensors. An example sensor system may comprise a magnetic position sensor. In a further example the sensor system may comprise a controller in communication with the magnetic position sensor. An example system may further comprise an adjustable delay circuit in communication with the controller for delaying communication of an alarm signal from the controller.

The invention further encompasses a method of detecting fluid flow through a valve. In an example embodiment, the valve comprises a valve housing. The valve housing defines a seat. A valve closing member is positioned within the valve housing and movable between a closed position sealingly engaged with the seat and preventing the fluid flow, and an open position permitting the fluid flow. An example embodiment of a method according to the invention comprises using a sensing arm mounted on the housing and engaged with the valve closing member to sense motion of the valve closing member between the closed position and the open position.

In an example method, sensing motion of the valve closing member may comprise sensing rotation of the sensing arm. The rotation of the sensing arm senses rotational motion of the valve closing member. Further by way of example, the rotation of the sensing arm senses translational motion of the valve closing member.

In an example embodiment the sensing arm may be fixedly mounted on a shaft, and the shaft is rotatably mounted on the housing. The step of sensing rotation of the sensing arm comprises sensing rotation of the shaft relatively to the valve housing in this example.

An example method according to the invention further comprises calibrating the valve. In a specific example embodiment, calibrating the valve comprises:

flowing fluid through the valve at a known rate;

determining a position of the sensing arm while the fluid is flowing at the known rate;

associating the position of the sensing arm with the known rate of fluid flow.

Another example of calibrating the valve comprises:

flowing fluid through the valve at a first known rate;

determining a first position of the sensing arm while the fluid is flowing at the first known rate;

associating the first known rate of the fluid flow with the first position of the sensing arm;

flowing fluid through the valve at a second known rate different from the first known rate;

determining a second position of the sensing arm while the fluid is flowing at the second known rate;

associating the second known rate of the fluid flow with the second position of the sensing arm.

In a practical example, the first and second known rates of the fluid flow range from 4 gallons (15 liters) per minute to 10 gallons (38 liters) per minute.

The invention further includes a fire suppression sprinkler system connectable to a water supply. In an example embodiment the sprinkler system comprises a standpipe connectable to the water supply and a plurality of fire suppression sprinklers. A piping network provides fluid communication between the standpipe and the sprinklers. A check valve controls fluid flow between the standpipe and the piping network. By way of example the check valve comprises a housing having an inlet connected to the standpipe and an outlet connected to the piping network. A seat surrounds the inlet. A shaft is rotatably mounted within the housing. A valve closing member is positioned within the housing and sealingly engageable with the seat. The valve closing member is mounted on the shaft and movable relatively thereto between an open position, allowing flow from the inlet to the outlet, and a closed position, preventing reversal of the flow. A sensing arm has a first end fixedly mounted on the shaft and a second end portion engaging the valve closing member. A spring acts to bias the sensing arm into contact with the valve closing member. A sensor system is adapted to sense rotation of the shaft relatively to the housing.

An example fire suppression system according to the invention may further comprise a shutoff valve positioned between the check valve and the standpipe for controlling fluid flow to the valve. Also by way of example, the shutoff valve may be positioned within the housing between the inlet and the valve closing member.

In an example system the check valve is calibrated by correlating a known rate of fluid flow with a rotational position of the shaft. In a practical example the check valve is calibrated to detect a fluid flow range from 4 gallons per minute (15 liters/minute) to 10 gallons per minute (38 liters/minute).

An example fire suppression system may further comprise a test and drain valve in fluid communication with the check valve at a position between the valve closing member and the outlet. Further by way of example, a pressure gage may be positioned in fluid communication with the check valve at a position between the valve closing member and the outlet. A pressure valve may also be positioned in fluid communication with the check valve at a position between the valve closing member and the outlet.

DETAILED DESCRIPTION

Figure 1:
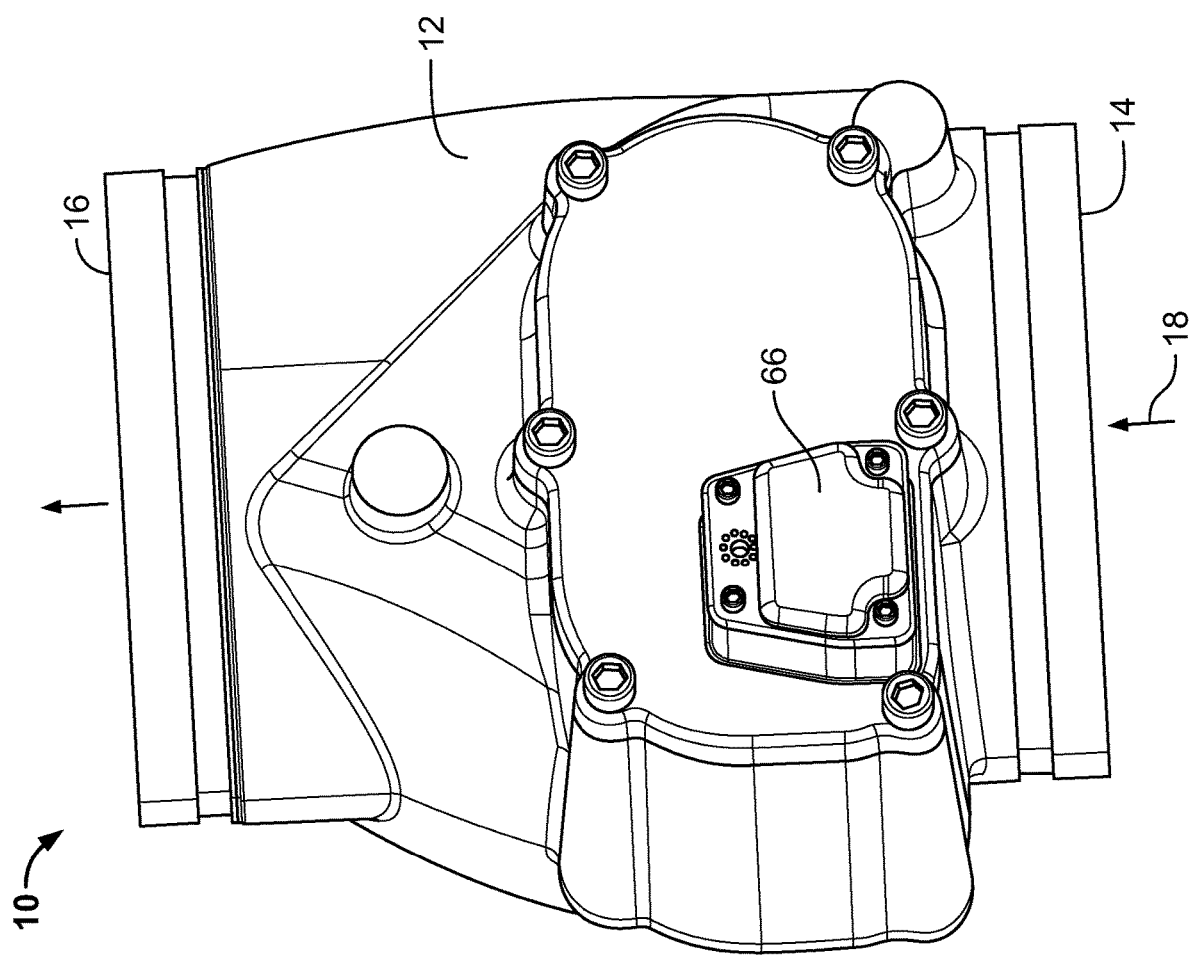
FIG. 1 is an isometric view of an example flow rate sensor according to the invention.
Figure 1A:
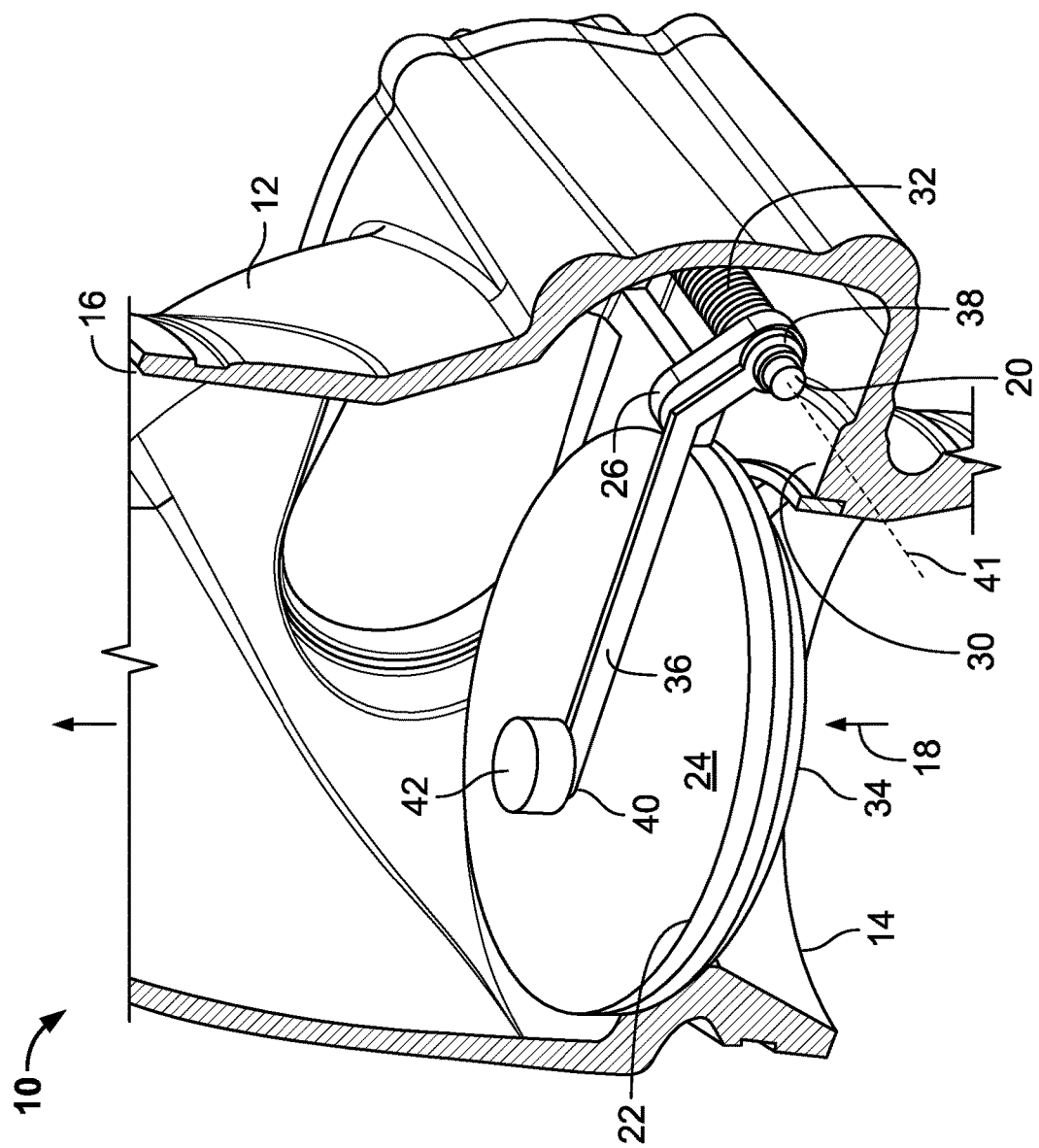
FIG. 1A is an isometric, partial sectional view of the example flow rate sensor shown in FIG. 1.
Figure 2:
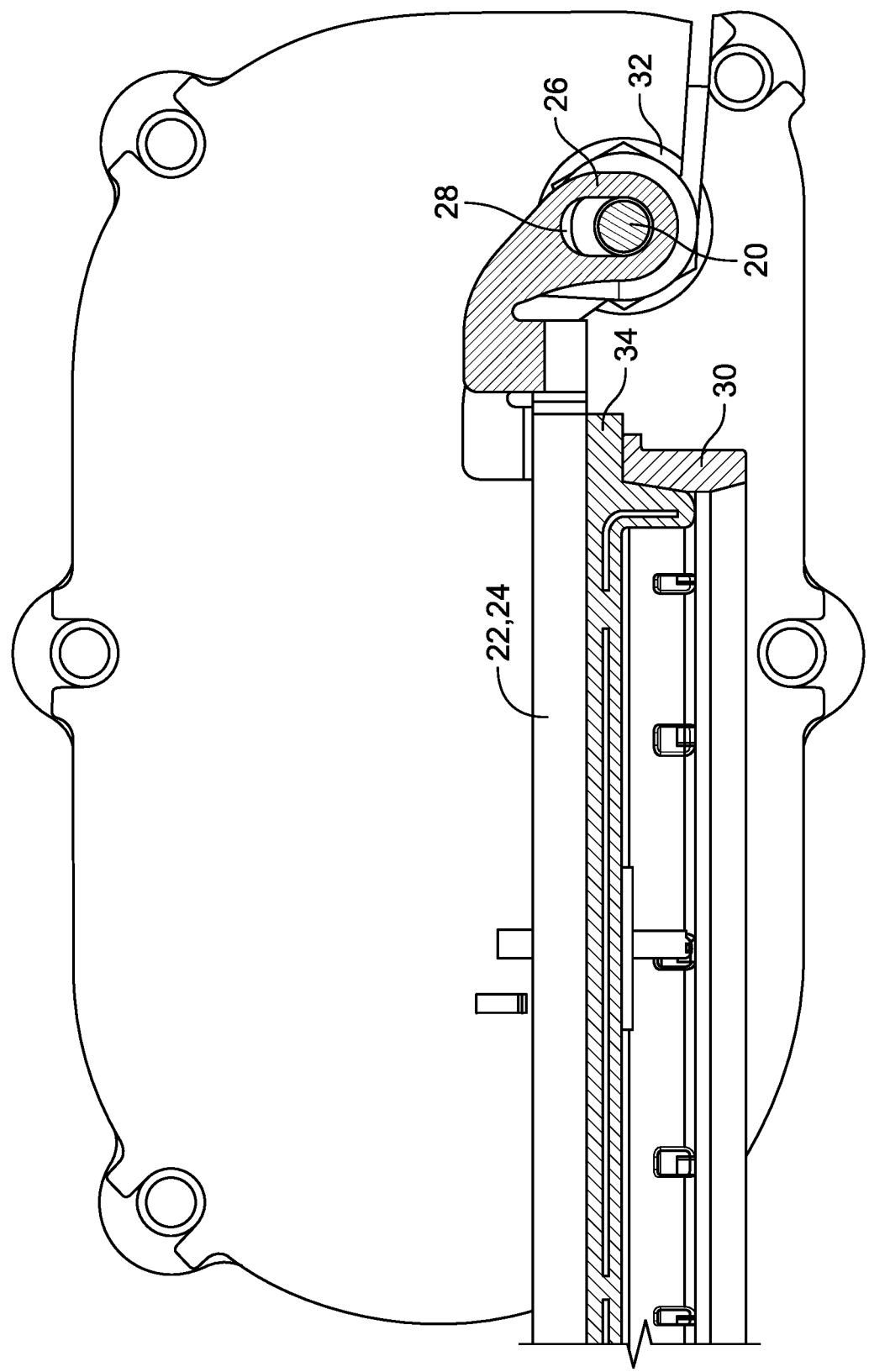
FIG. 2 is an elevational view of components of the example flow rate sensor of FIG. 1 on an enlarged scale.

One aspect of the invention concerns a flow rate sensor. As shown in FIG. 1, an example embodiment of a flow rate sensor 10 according to the invention comprises a housing 12 having an inlet 14 and an outlet 16. As further shown in FIG. 1A, housing 12 defines a fluid flow path 18 between the inlet and the outlet. A shaft 20 is rotatably mounted within the housing 12. An obturation body 22 is positioned within the housing 12 between the inlet 14 and the outlet 16. The obturation body 22 is mounted on the shaft 20 and is movable relatively thereto and relatively to the housing 12 in response to fluid flow between the inlet 14 and the outlet 16. In this example embodiment the obturation body 22 comprises a disk 24 oriented transversely to the flow path 18. As shown in FIG. 2, the obturation body 22 further comprises at least one lug 26 extending between the disk 24 and the shaft 20. Lug 26 defines a hole 28 which receives the shaft 20. In this example embodiment the hole 28 is sized and shaped to permit both rotational and translational motion of the disk 24 relatively to the shaft 20. A seat 30 may be positioned within housing 12 to support the obturation body 22. In this example, seat 30 surrounds the inlet 14 to permit engagement between the obturation body 22 and the seat. As shown in FIG. 1A, a spring 32 acts between the obturation body 22 and the housing 12 for biasing the obturation body into engagement with the seat 30. FIG. 2 shows an optional seal 34 which may be positioned between and mounted on one of the seat 30 or the obturation body 22. In this example embodiment seal 30 is mounted on the obturation body 22. A seal may be advantageous in order to further improve sensitivity to very small flows of fluid by ensuring that the obturation body must be moved some amount to permit even those small flows.

Figure 3:
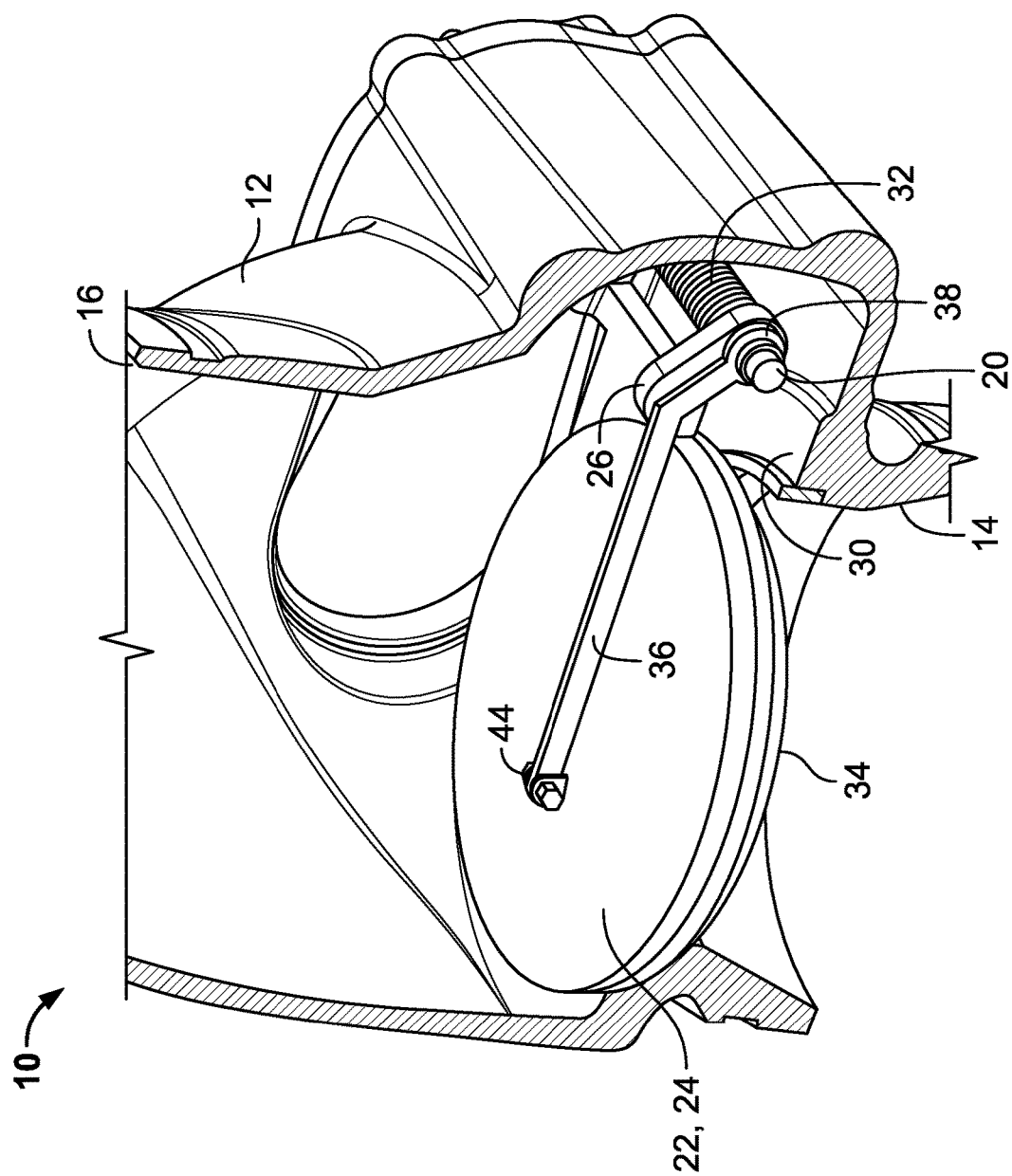
FIG. 3 is an isometric, partial sectional view of another example embodiment of a flow rate sensor according to the invention.
Figure 4:
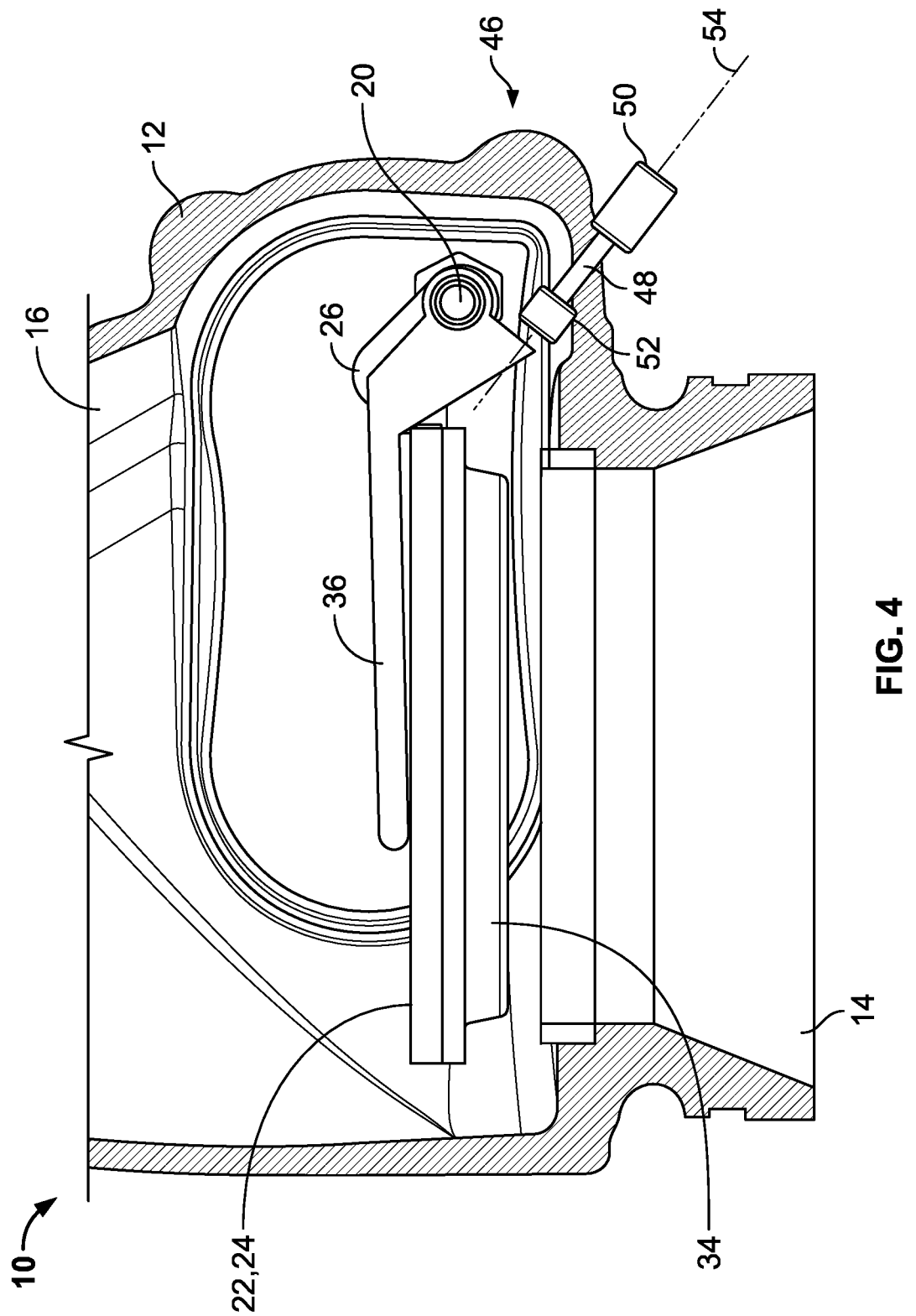
FIGS. 4 and 4A are elevational, partial sectional views of other example embodiments of a flow rate sensor according to the invention.
Figure 4A:
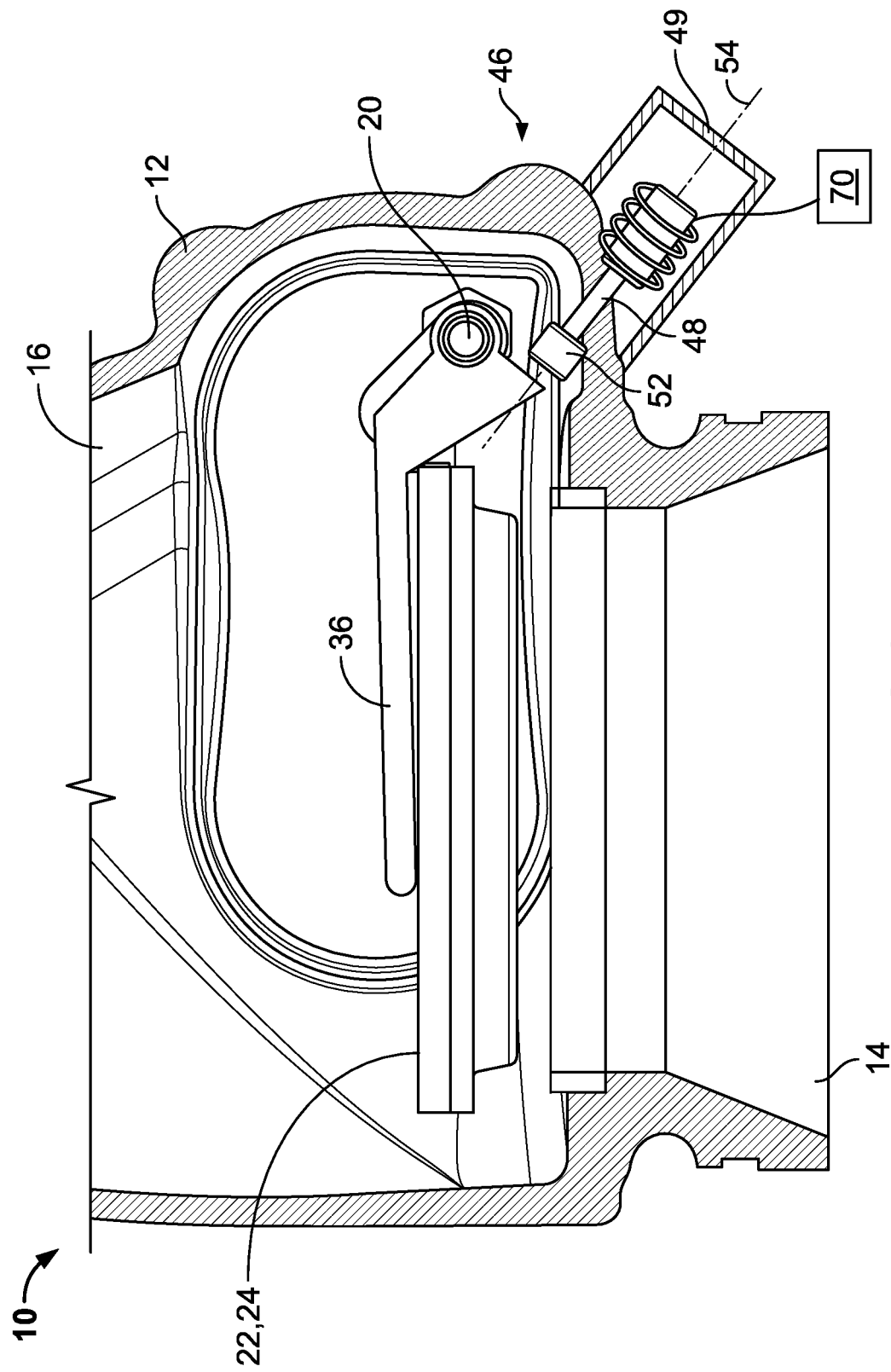
Figure 5:
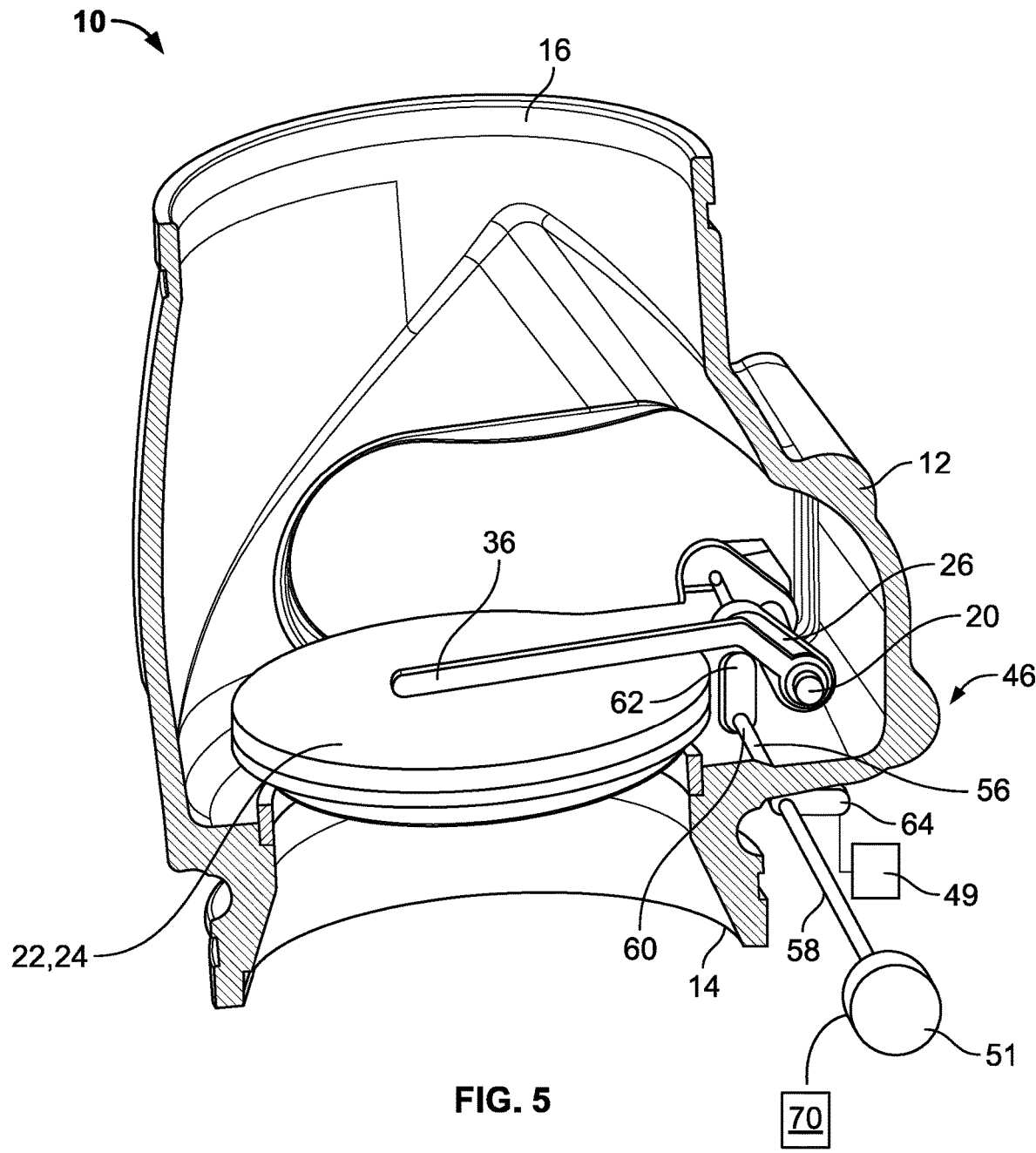
FIG. 5 is an isometric, partial sectional view of another example embodiment of a flow rate sensor according to the invention.

As shown in FIG. 1A, flow rate sensor 10 further comprises a sensing arm 36. Sensing arm 36 has a first end 38 fixedly mounted on the shaft 20 and a second end 40 engaging the obturation body 22. In this instance the term "fixedly mounted" means attached or integrally formed such that the sensing arm 36 rotates with the shaft. Engagement between the first end 38 and shaft 20 thus may be via an interference fit, splined, welded, brazed, keyed, swaged, integrally cast and machined or forged to ensure that the shaft 20 and arm 36 rotate together about the shaft longitudinal axis 41. Sensing arm 36 moves in response to motion of the obturation body and, via shaft 20, transmits its motion to a sensor system (described below) which generates a signal indicative of the flow rate of fluid through the housing, the motion of the obturation body being proportionally calibrated to the flow rate in order to detect fluid flow rate in units of volume per time, such as GPM. In this example embodiment a weight 42 is mounted on the sensing arm 36 distal to the shaft 20. In this example the weight 42 is positioned at the second end 40 of sensing arm 36 and serves to maintain engagement between the sensing arm and the obturation disk. In another example embodiment, shown in FIG. 3 a link 44 extends between the sensing arm 36 and the obturation body 22. Link 44 is positioned distal to the shaft 20 for flexibly connecting the sensing arm 36 to the obturation body 22. In this example the link comprises a journaled pin connection permitting rotation of the sensing arm 36 relatively to the obturation body. Other types of connections which permit sensing arm to rotate It is advantageous to test the freedom of motion of the sensing arm 36 as well as operation of the sensor system without unseating or otherwise moving obturation body 22. Further advantage may be had if the sensing arm 36 can be moved, either manually or automatically by remote control, via a control external to the housing 12. Such testing is made possible using an actuator 46. An example manual actuator 46 is shown in FIG. 4 and comprises a push rod 48 having a first end 50 extending from the housing 12, and a second end 52 engageable with the sensing arm 36 proximate to the shaft 20. Push rod 48 defines a line of action 54 eccentric to the shaft 20 thereby enabling a force applied to the push rod to rotate the sensing arm about the shaft. The push rod design of FIG. 4 lends itself well to an automated actuator 46 shown in FIG. 4A, wherein an electrically powered solenoid 49 may be used to effect motion of the push rod 48. Solenoid 49 may communicate with a microprocessor controller 70, described below, to effect testing and reporting functions of the actuator 46 in response to user commands. FIG. 5 illustrates another embodiment of an actuator 46, which in this example, comprises an axle 56 having a first end 58 projecting from the housing 12 and a second end 60 positioned within the housing proximate to the shaft 20. A cam 62 is mounted on the second end 60 of the axle 56. The cam 62 is rotatable into and out of engagement with the sensing arm 36 upon rotation of the axle 56 to effect rotation of the sensing arm 36 and consequently the shaft 20. An electric motor 51 controlled by controller 70 may be directly coupled to axle 56 to effect rotation. The actuator 46 may further comprise a lever arm 64 attached to the first end 58 of the axle 56. Lever arm 64 extends transversely to the axle 56 and provides leverage for easy manual rotation of the axle, or for remote actuation by means of a solenoid 49 also controlled by controller 70.

Figure 6:
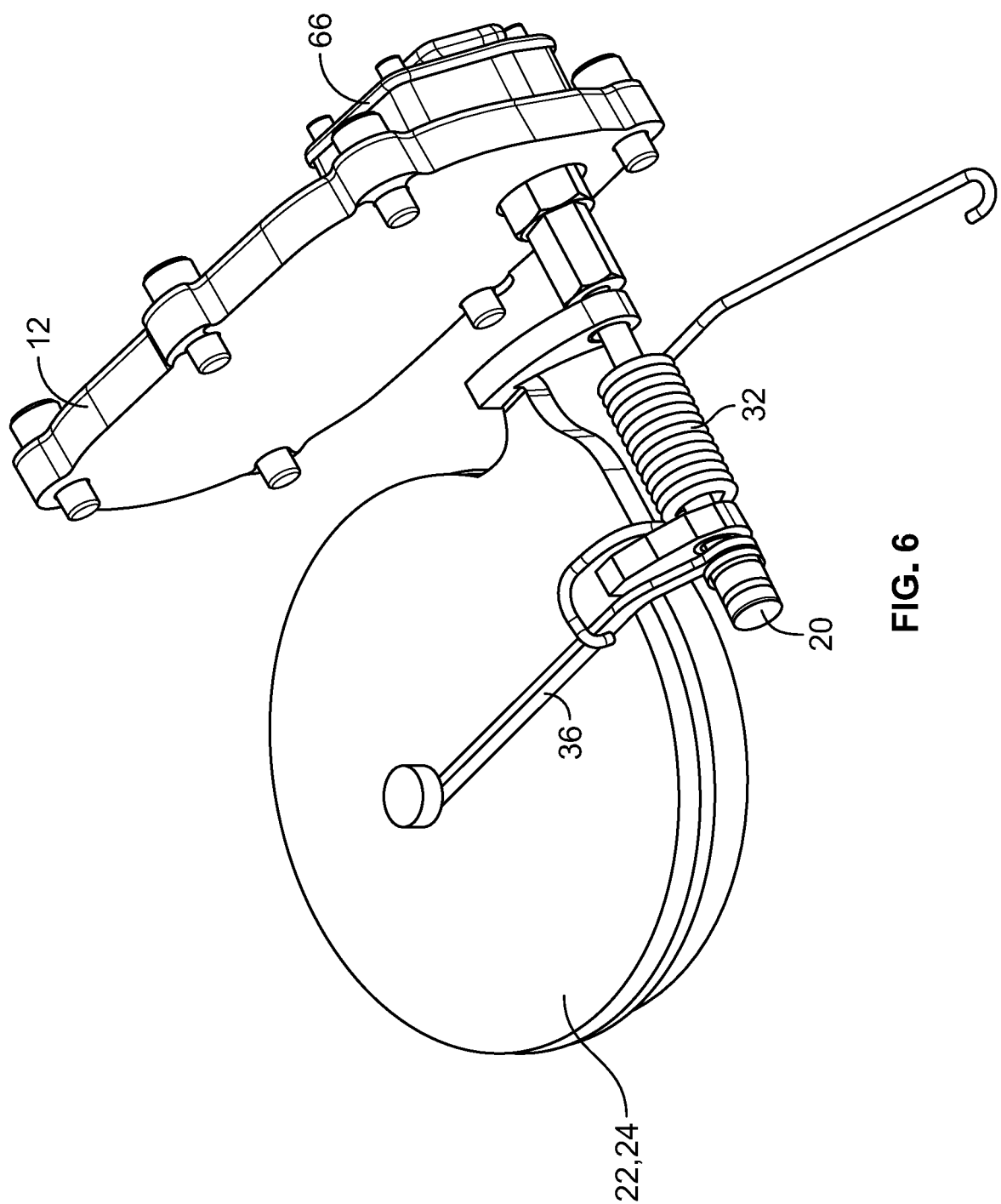
FIG. 6 is an isometric view of components used with an example flow rate sensor according to the invention.
Figure 7:
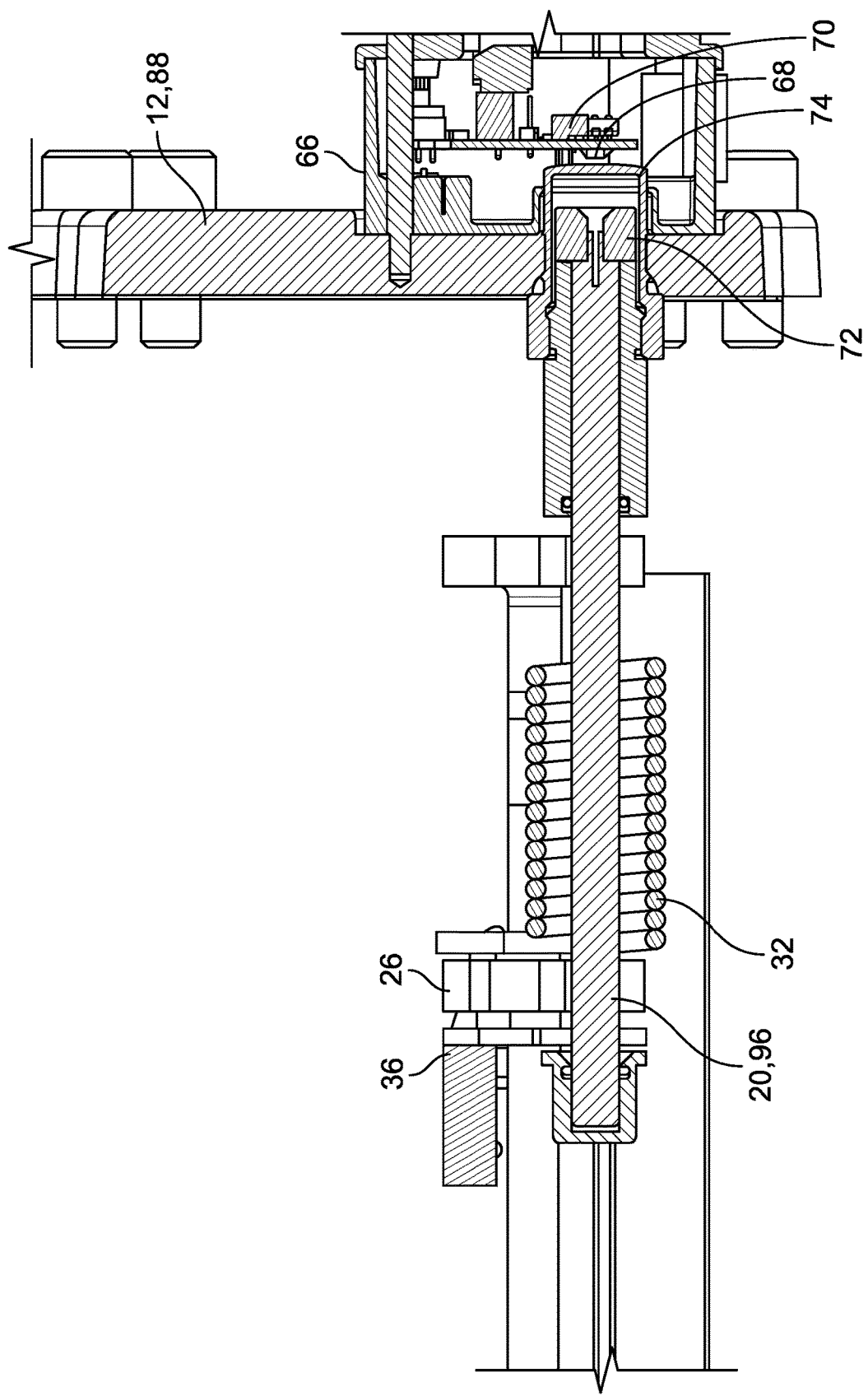
FIG. 7 is an elevational view of components used with an example flow rate sensor according to the invention.

Flow rate sensor 10 further comprises a sensor system adapted to sense rotation of the shaft 20 relatively to the housing 12. As shown in FIGS. 1, 6 and 7, a sensor system 66 is mounted on the housing 12. Sensor system 66 advantageously comprises a non-contacting rotary sensor positioned on an exterior of the housing 12 and is thus isolated from the working fluid therewithin. Such non-contacting rotary sensors include magnetic sensors, Hall-effect sensors, or capacitive sensors and encoders. In this example, sensor system 66 comprises a magnetic position sensor 68, shown in FIG. 7 and adapted to sense rotation of the shaft 20 relatively to the housing 12. Position sensor 68 is in communication with a microprocessor controller 70. In a practical example design an MLX90365 Gen III Triaxis® rotary and linear position sensor IC marketed by Melixis NV of Belgium are feasible. The MLX90365 is described as a monolithic magnetic position processor integrated circuit having a Triaxis® Hall magnetic front end (position sensor 68) and an analog to digital signal conditioner, a DSP for advanced signal processing, and an output stage driver.

As shown in FIG. 7, the sensor system 66 of valve 10 further comprises a magnet 72 fixedly mounted on the shaft 20, advantageously at the end of the shaft. Magnet 72 is positioned proximate to the position sensor 68 but within the housing 12. Magnet 72 is surrounded by a non-magnetic sheath 74 projecting from the housing 12, the internal volume of the sheath seeing the pressure of the working fluid within the housing 12. It is advantageous to form sheath 74 from a material which is substantially transparent to the magnetic field of magnet 72, allowing changes in the field to be sensed by the position sensor 64 when the sensing arm 36 moves shaft 20. For high pressure applications, brass, bronze and stainless steel are expected to provide the strength necessary to withstand the internal pressure while being magnetically transparent. Stainless steel is furthermore corrosion resistant and thus advantageous for parts having tight clearances and relative movement. For low pressure applications a polymer sheath may be advantageous.

Figure 8:
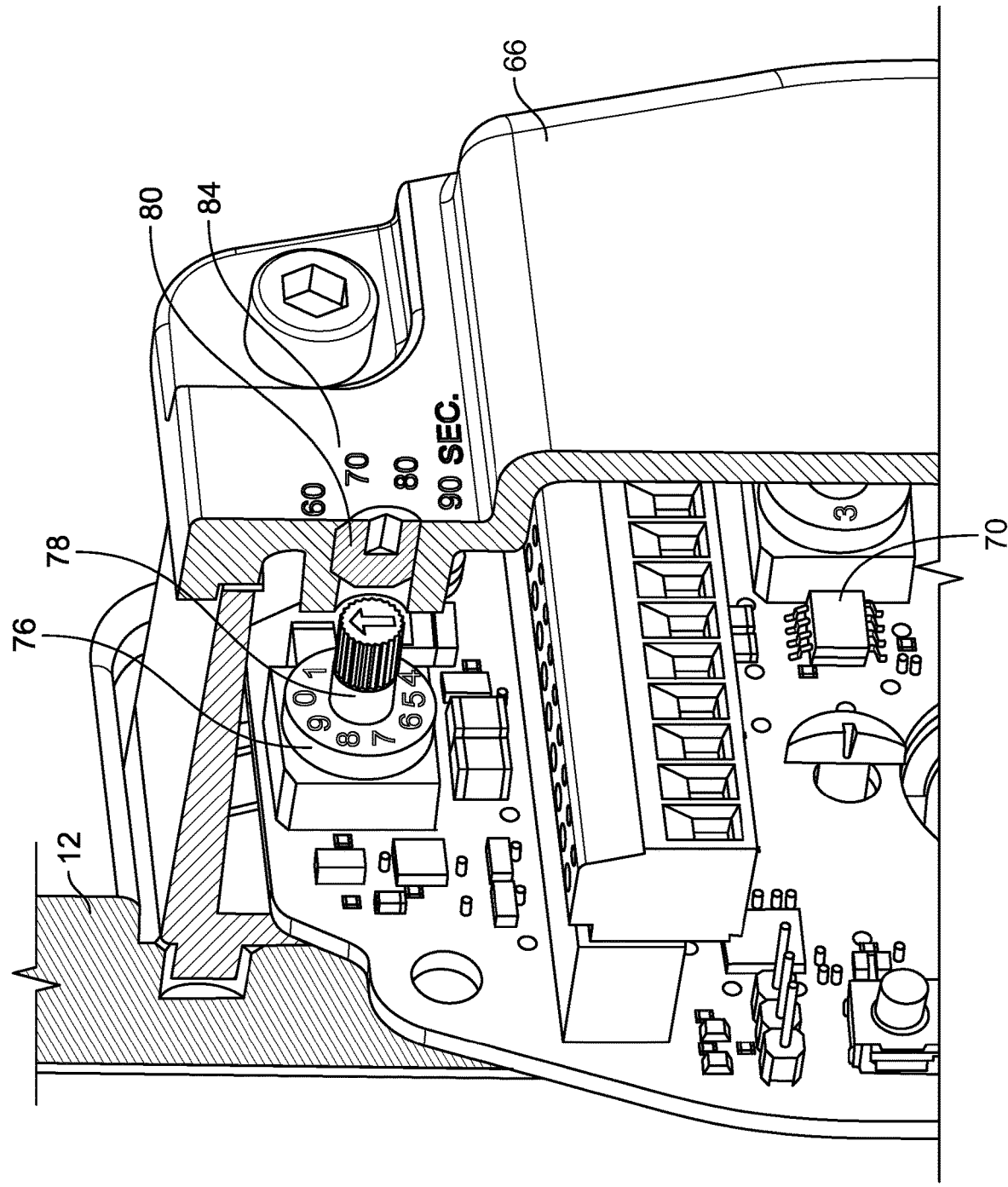
FIG. 8 is an isometric, partial cut away view of an example control system used with flow rate sensors and valve according to the invention.

As shown in FIG. 8, the sensor system 66 further comprises adjustable delay circuitry 76 in communication with the controller 70 for delaying communication of an alarm signal from the controller indicating motion of obturation body 22. A fluid pressure surge may momentarily disturb the position of the obturation body, and such motion will be detected by the sensor system 66. Use of delay circuit 76 allows programming of the valve sensor system 66 to avoid misidentifying a minor or momentary pressure surge as significant fluid flow through housing 12. Delays of up to 90 seconds may be programmed in a practical design to mitigate or eliminate signaling of insignificant flow. In the example embodiment shown in FIG. 8, the delay circuit 76 is implemented via a rotary dip switch 78. Dip switch 78 is accessible from the outside of the sensor system 66 by removing a protective screw 80 from a through hole in the sensor system cover 82 and then inserting a tool, such as a driver, into the sensor system and rotating the dip switch 78. Indicia 84, adjacent the through hole, aid in setting the desired delay.

Figure 9:
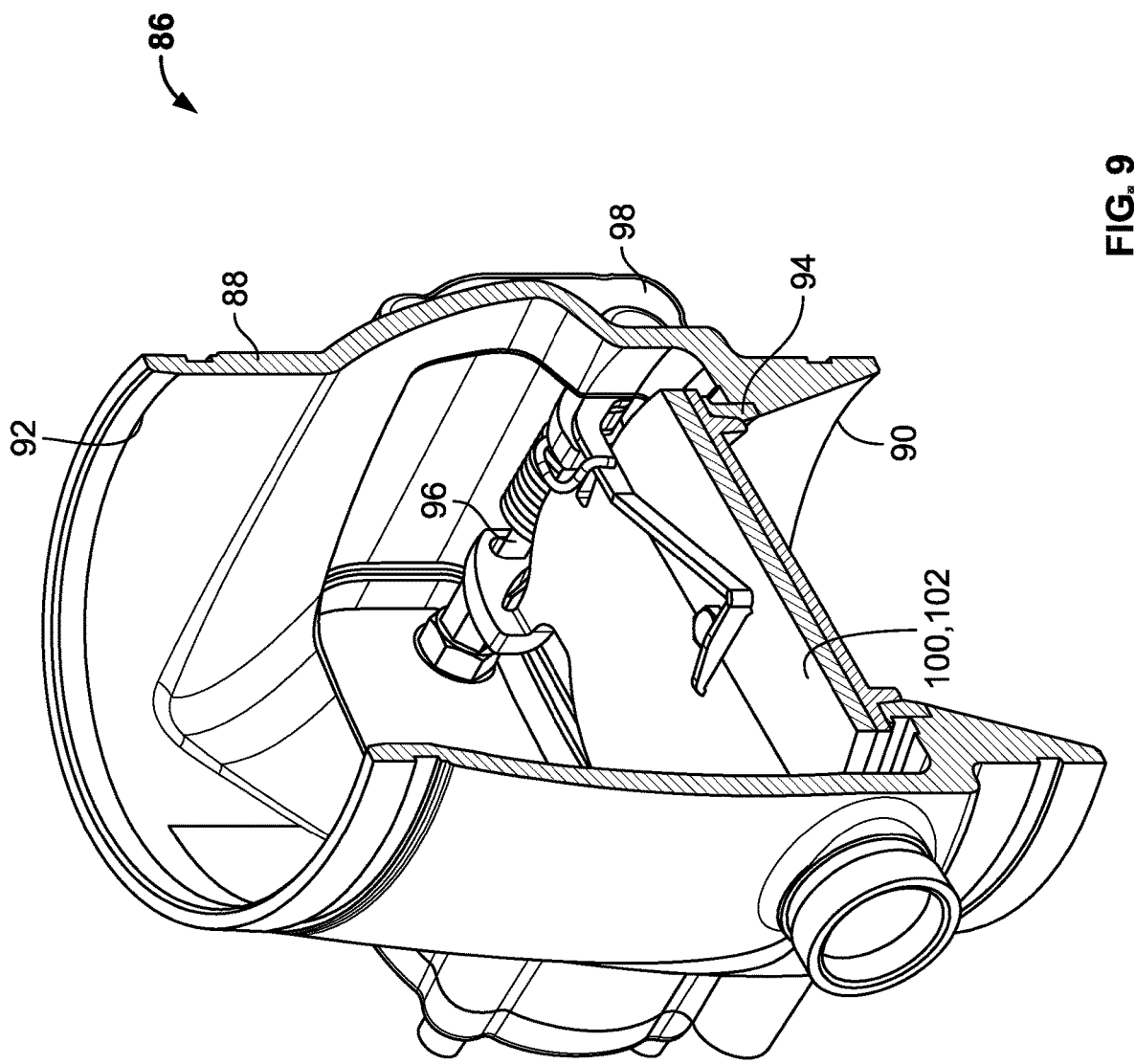
FIG. 9 is an isometric partial cut-away view of an example valve according to the invention.
Figure 10:
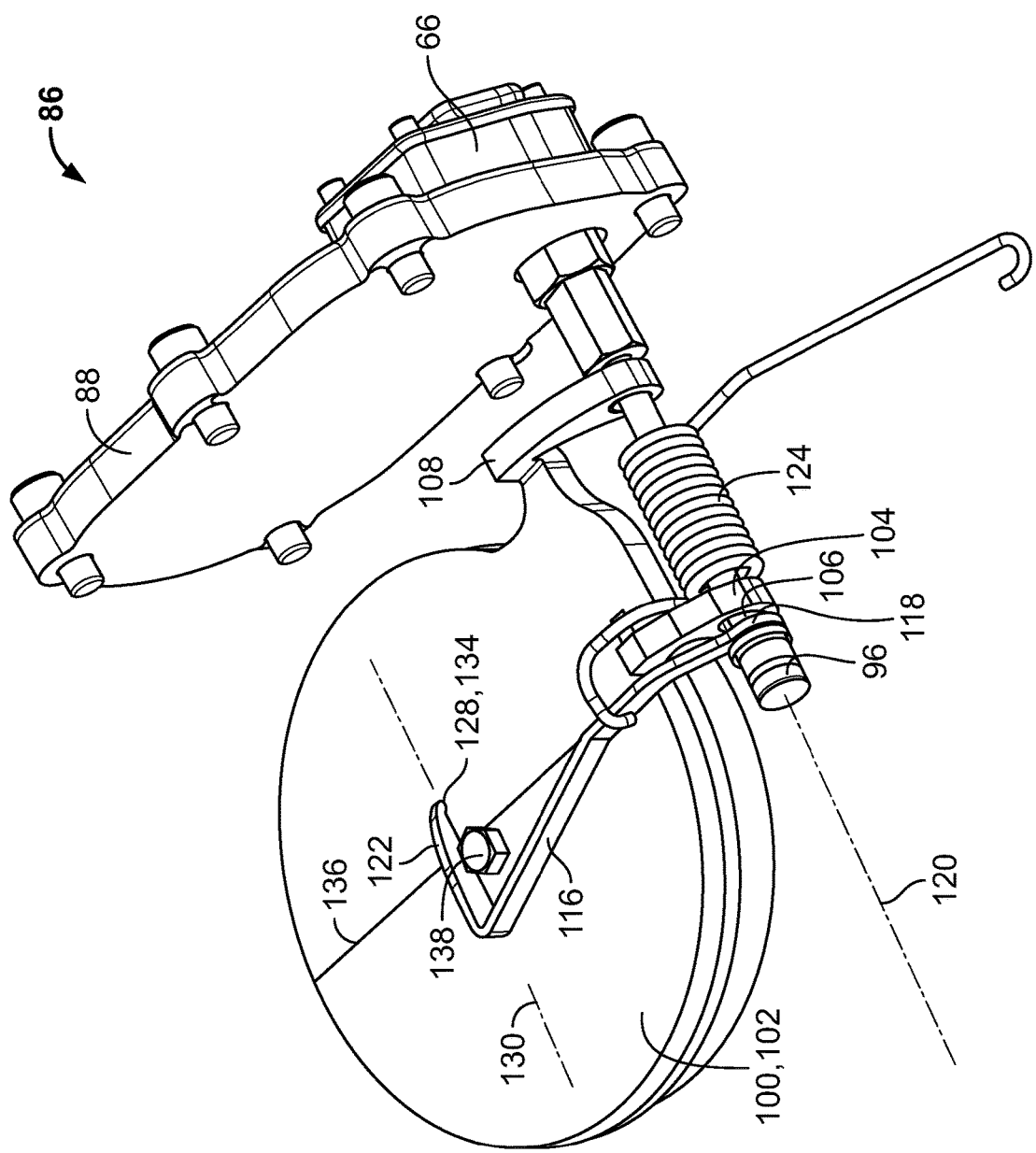
FIG. 10 is an isometric view of components used in the valve shown in FIG. 9.
Figure 11:
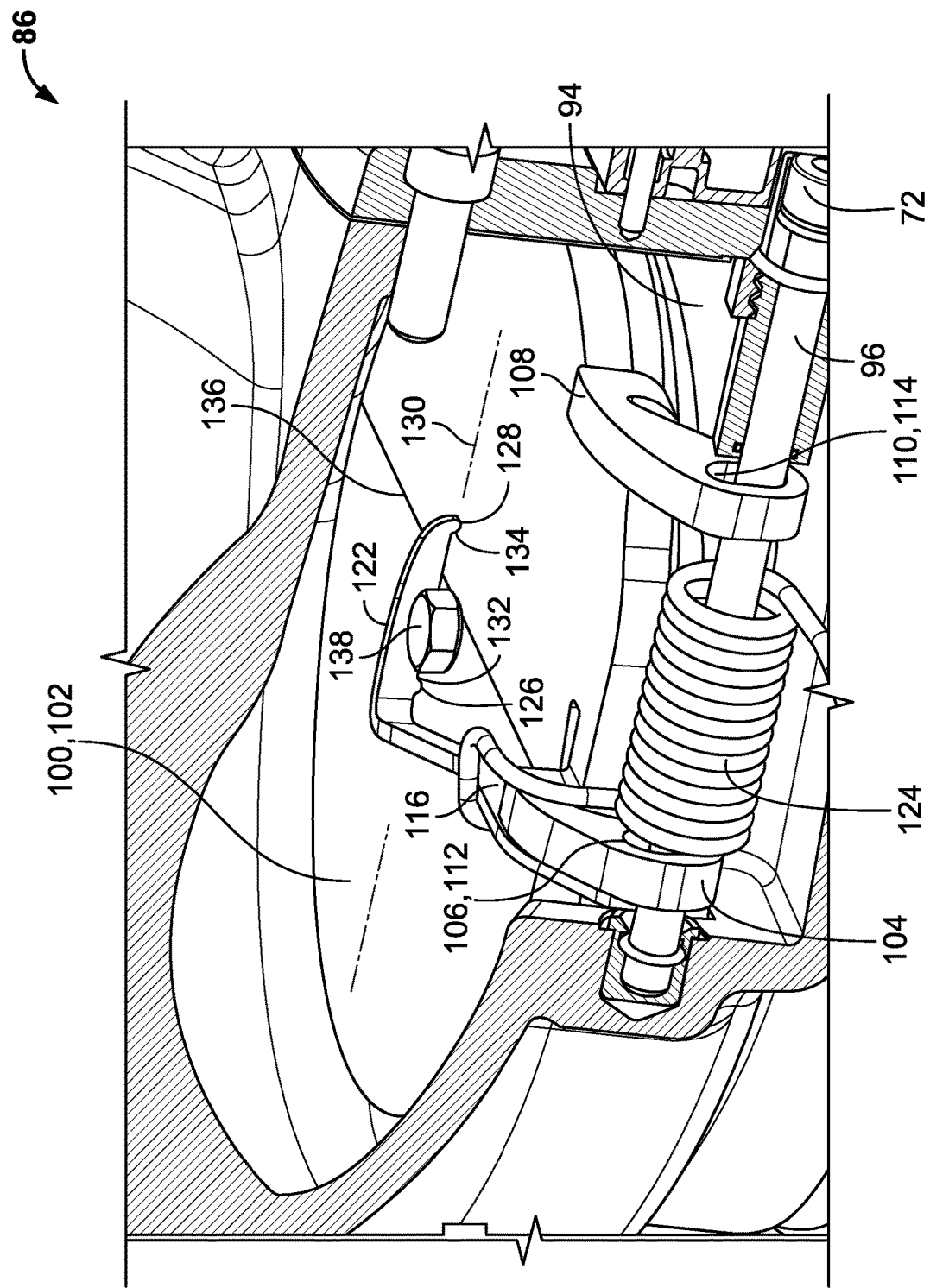
FIG. 11 is an isometric, partial cut-away view of a portion of the valve shown in FIG. 9.

Another aspect of the invention concerns a valve, for example, a wet system valve or a dry system valve such as might be used as a check valve in a fire suppression system with integrated flow detection and sensing. FIG. 9 shows an example embodiment of a valve 86 according to the invention, the valve comprising a housing 88 having an inlet 90 and an outlet 92. A seat 94 surrounds the inlet 90. A shaft 96 is rotatably mounted within the housing 88 between the inlet 90 and the outlet 92. In this example shaft 96 is rotatable on a pair of bearings 98, or for smaller sizes, a single bearing 98 which may be integrally formed in the structure of housing 88 or which may be formed by components which are pressed or otherwise attached to housing 88. A valve closing member 100 is positioned within the housing 88 and is sealingly engageable with the seat 94. The valve closing member 100 is mounted on the shaft 96 and is movable relatively thereto between an open position allowing flow from the inlet 90 to the outlet 92, and a closed position (shown) sealingly engaging seat 94 preventing the flow. In this example embodiment the valve closing member comprises a disk 102 sealingly engageable with the seat 94. As shown in FIGS. 10 and 11, a first lug 104 projects from the disk 102. First lug 104 defines a first opening 106 receiving the shaft 96. A second lug 108 also projects from the disk 102. The second lug 108 is arranged in spaced relation to the first lug 104 and defines a second opening 110 receiving the shaft 96. Disk 102 is not rotationally fixed to shaft 96, but is rotatable about and relatively to the shaft. It is advantageous that the first and second openings 106 and 110 be respective first and second oversized slots 112 and 114. The first and second slots 112 and 114 are oriented relatively to the disk 102, in this example transversely to the plane of the disk, so as to permit translational motion of the disk toward and away from the seat 94 as well as rotational motion of the disk relatively to the shaft 96. This relative translational and rotational movement allows disk 102 to float relative to seat 94 ensuring a good seal across a range of practical conditions. Other configurations of slots 112 and 114 which permit relative translational and rotational motion of disk 102, such as oblong or oversized holes, are also feasible.

Figure 10A:
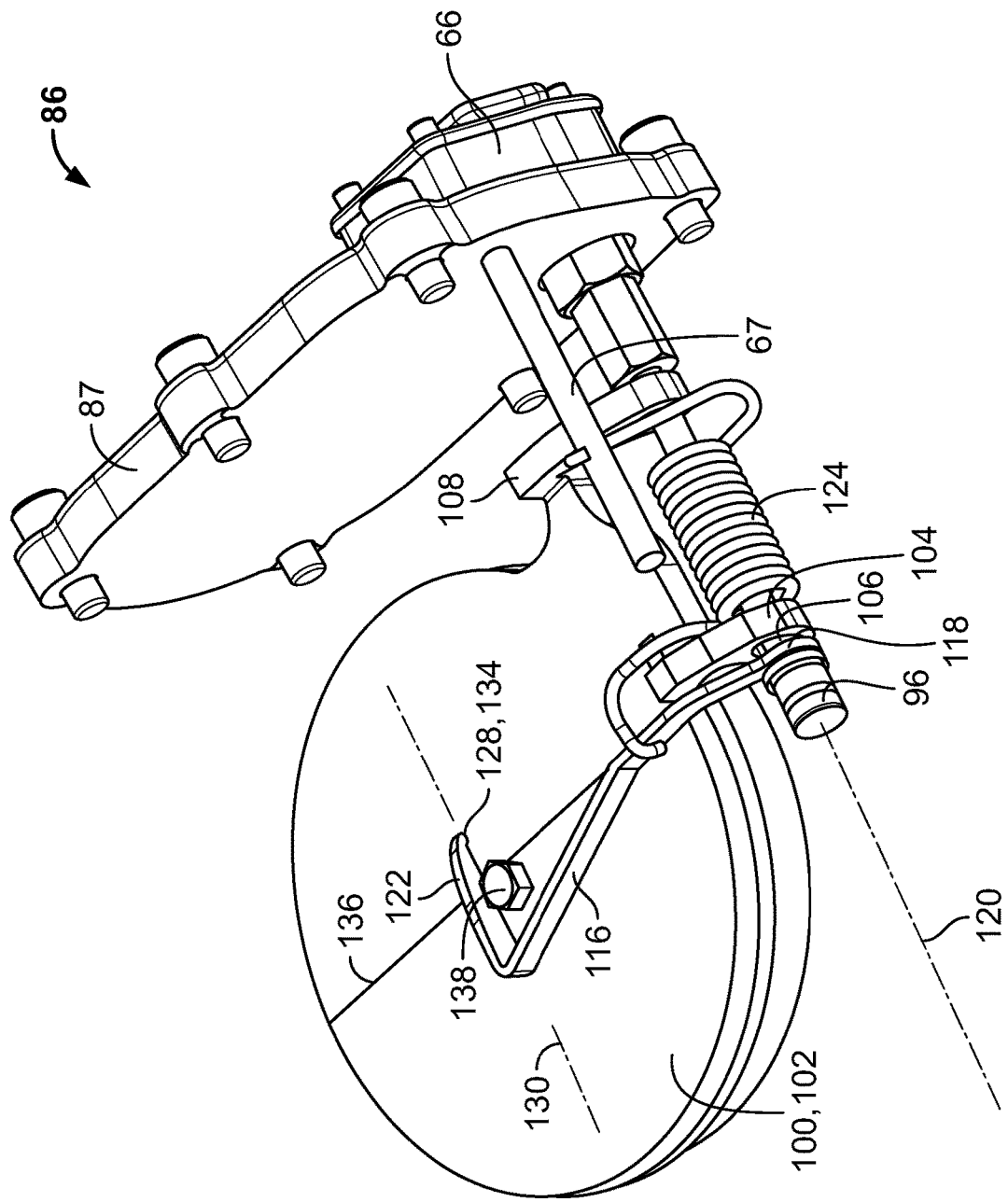
FIG. 10A is an isometric view of components of an alternate embodiment used in the valve shown in FIG. 9 as well as the flow rate sensor shown in FIG. 1.

As shown in FIG. 10, valve 86 further comprises a sensing arm 116 having a first end 118 fixedly mounted on the shaft 96. In this instance the term "fixedly mounted" means attached or integrally formed such that the sensing arm 116 rotates with the shaft. Engagement between the first end 118 and shaft 96 thus may be via an interference fit, splined, welded, brazed, keyed, swaged, integrally cast and machined or forged to ensure that the shaft 96 and arm 116 rotate together about the shaft longitudinal axis 120. A second end portion 122 of sensing arm 116 engages the valve closing member 100, in this example, disk 102. A spring 124 acts between the housing 88 (see also FIG. 9) to bias the valve closing member 100 into the closed position shown, and it is advantageous if the spring 124 biases the valve closing member 100 in the closed position by acting against sensing arm 116, thus keeping sensing arm in intimate contact with the valve closing member 100 as shown in FIG. 10. Urging contact between sensing arm 116 and valve closing member 100 permits sensing arm 116 to respond by rotation to motion of the valve closing member 100, whether translational, rotational, or a combination of motions. Permitting sensing arm 116 to respond to complex motion of the valve closing member increases the sensitivity of the flow rate sensor. However, other arrangements are feasible, such as having spring 124 acting directly against valve closing member 100, and having an additional spring act against sensing arm 116 in order to bias it into contact with valve closing member 100. Other methods of ensuring that sensing arm 116 be maintained or urged into contact with valve closing member 100, such as the weighted arm 42 described in the embodiment of FIG. 1A are feasible and within the scope of this invention. An alternate embodiment is shown in FIG. 10A, wherein a projection 67 extends from the sensor system 66 into the valve housing 88 (the cover plate 87 in this example being considered part of the sensor system). In this example, spring 124 acts between the projection 67 and the sensor arm 116. It is expected that this configuration of spring 124 and projection 67 will eliminate variations in the spring preload due to casting tolerances affecting the dimensions of the inner surface of the housing 88. A smaller range of positional tolerances of the projection 67 are expected to be feasible, which, in turn, should result in a more repeatable positioning of the projection, a smaller production variation in the spring preload, and thus improved consistency in valve response throughout production. Spring preload may be even more precisely controlled where projection 67 is eccentric or cam-like in cross section, such that rotation of the projection 67 relative to sensor system 66 may minutely affect the preload on spring 124 by altering the location of engagement between projection 67 and spring 124. These example embodiment may also be used to react the spring for the flow rate sensor previously described.

It is advantageous if the second end portion 122 of the sensing arm 116 extends in a direction substantially parallel to the shaft 96. As shown in FIG. 11, first and second projections 126 and 128 extend from the second end portion 122. Second projection 128 is arranged in spaced relation to the first projection 126 and engages the valve closing member 100 (disk 102). The first and second projections 126 and 128 are thus aligned along a line 130 oriented substantially parallel to the shaft 96.

As the sensing arm 116 is part of a sensor system used to detect and measure motion of the valve closing member 100 it is advantageous to position the second end portion 122 of the sensing arm such that the sensing arm provides the maximum sensitivity possible. To this end, the second end portion 122 is positioned such that the first and second projections 126 and 128 engage the disk 102 at first and second points 132 and 134 on opposite sides of a diametral line 136 oriented transversely to the shaft 96. This position of contact between the sensing arm 116 and the disk 102 further helps prevent the disk from teetering about line 136, and helps increase sensitivity to such teetering. Increased sensitivity is also realized by positioning the second end portion 122 of sensing arm 116 proximate to the center 138 of the disk 102. Advantage may be had when the first and second points 132 and 134 are located over center of the disk 102 relatively to the shaft 96 as shown in FIG. 10. In this context, the term "over center" refers to a position beyond the center 138 when measured relative to an axis of rotation, such as shaft axis 120.

As shown in FIG. 10, the sensor system 66 as described above and shown in FIGS. 7 and 8, is mounted on the housing 88 of valve 86. As with the rate sensor 10 described above, it is advantageous to use a non-contacting rotary sensor positioned on an exterior of the housing 88 which is thus isolated from the working fluid within the valve 86. Non-contacting rotary sensors including magnetic sensors, Hall-effect sensors, or capacitive sensors and encoders are expected to provide a practical valve design. In this example, similar to rate sensor 10, the magnetic position sensor 68, shown in FIG. 7, is adapted to sense rotation of the shaft 96 relatively to the housing 88. Position sensor 68 is in communication with a microprocessor controller 70. In a practical example design, an MLX90365 Gen III Triaxis® rotary and linear position sensor IC marketed by Melixis NV of Belgium are feasible.

As shown in FIG. 7, the sensor system 66 of valve 10 again comprises a magnet 72 fixedly mounted on the shaft 96, advantageously at the end of the shaft. Magnet 72 is positioned proximate to the position sensor 68 but within the housing 12. Magnet 72 is surrounded by the non-magnetic sheath 74 projecting from the housing 88, the internal volume of the sheath seeing the pressure of the working fluid within the housing 12.

It is expected that the valve 86 may be employed in methods to detect and measure fluid flow between the inlet 90 and the outlet 92. An example method of detecting fluid flow through the valve 86 according to the invention comprises using the sensing arm 116 to detect motion of the valve closing member 100. As sensing arm 116 is mounted on the housing 88 and engaged with the valve closing member 100, its motion serves as a proxy for motion of the valve closing member 100, whose motion and position between the closed position (sealingly engaged with the valve seat 94, indicative of no flow) and an open position disengaged from the valve seat, can be directly correlated with flow through the valve.

Thus, sensing motion of the valve closing member 100 comprises sensing motion of the sensing arm 116. As described above, the sensing arm 116 is fixedly mounted on the shaft 96, and the shaft is rotatably mounted on the housing 88. Because the sensing arm is engaged with the valve closing member 100, the sensing arm rotates in response to both translational and rotational motion of the valve closing member when it disengages from the seat 94 in response to fluid flow through the valve 86. Therefore, sensing fluid flow through valve 86 is accomplished by sensing motion of the sensing arm 116, which in this example comprises sensing rotation of the shaft 96 relatively to the valve housing 88 using the sensor system 66. Sensing rotation of the shaft 96 is expected to provide reliable and repeatable indications of fluid flow through the valve 86.

The example method of detecting fluid flow through the valve 86 may serve as a basis for measuring the rate of fluid flow by calibrating the valve. By way of example, further steps added to the aforementioned detection method to calibrate the valve may comprise:

flowing fluid through the valve 86 at a known rate;
determining a position of the sensing arm 116 while the fluid is flowing at the known rate;
associating the position of the sensing arm 116 with the known rate of fluid flow.

It is thought advantageous to calibrate the valve across a range of flow rates. Example method steps for this calibration include:

flowing fluid through the valve 86 at a first known rate;
determining a first position of the sensing arm 116 while the fluid is flowing at the first known rate;
associating the first known rate of the fluid flow with the first position of the sensing arm 116;
flowing fluid through the valve 86 at a second known rate different from the first known rate;
determining a second position of the sensing arm 116 while the fluid is flowing at the second known rate;
associating the second known rate of the fluid flow with the second position of the sensing arm 116.

These calibrating steps may of course be repeated for more than two known flow rates in a practical design. An example range of flow rates of interest may be fluid flows from about 4 gallons (15 liters) per minute to about 10 gallons (38 liters) per minute, but other ranges are of course feasible. As noted above, determination of the various positions of the sensing arm 116 during fluid flow through the valve 86 may be accomplished using the sensor system 66 to determine the rotational position of the shaft 96. The various positions of the sensing arm 116 may be associated with the corresponding known flow rates using, for example, a look-up table stored in memory of the microprocessor controller 70 of sensor system 66. Alternately, a functional relation between sensing arm position and flow rate can be derived and the function stored in the controller 70. The controller 70 may use the position of the sensing arm and the table or function to calculate and display the flow rate. Flow volume may then be calculated by the controller by integrating the flow rate over time. Dial indicators may also be used to display the position of the sensing arm, with the dial calibrated according to flow rate. Where an eccentric or cam-like projection 67 is employed, the calibration may additionally include rotation of projection 67 to adjust the preload on spring 124. Such adjustment may be made, for instance, in order to increase the consistency or precision of the calibration.

As shown in FIG. 8, the sensor system 66 further comprises adjustable delay circuitry 76 in communication with the controller 66 for delaying communication of an alarm signal from the controller indicating opening of the valve 10. A water pressure surge may momentarily disturb the position of the valve closing member 100 (see FIG. 9), and such motion will be detected by the sensing system 66. Use of delay circuit 76 allows programming of the sensing system 66 to avoid misidentifying a minor water pressure surge as an opening of valve 86 in response to a fire for example. Delays of up to 90 seconds may be programmed in a practical design to mitigate or eliminate signaling of false fire alarms by the valve 86.

Figure 12:
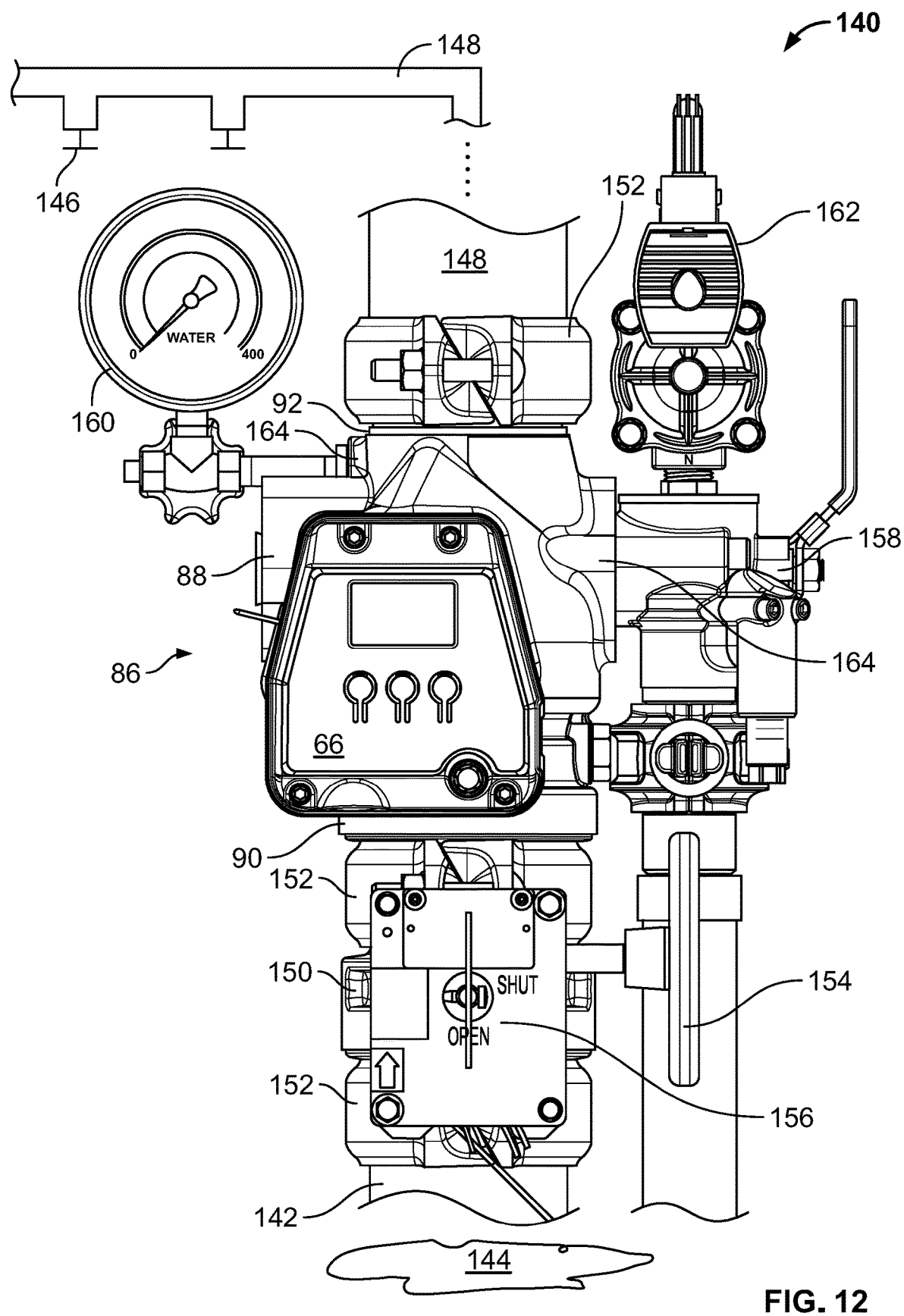
FIGS. 12 and 13 are schematic diagrams of example fire suppression sprinkler systems according to the invention.
Figure 13:
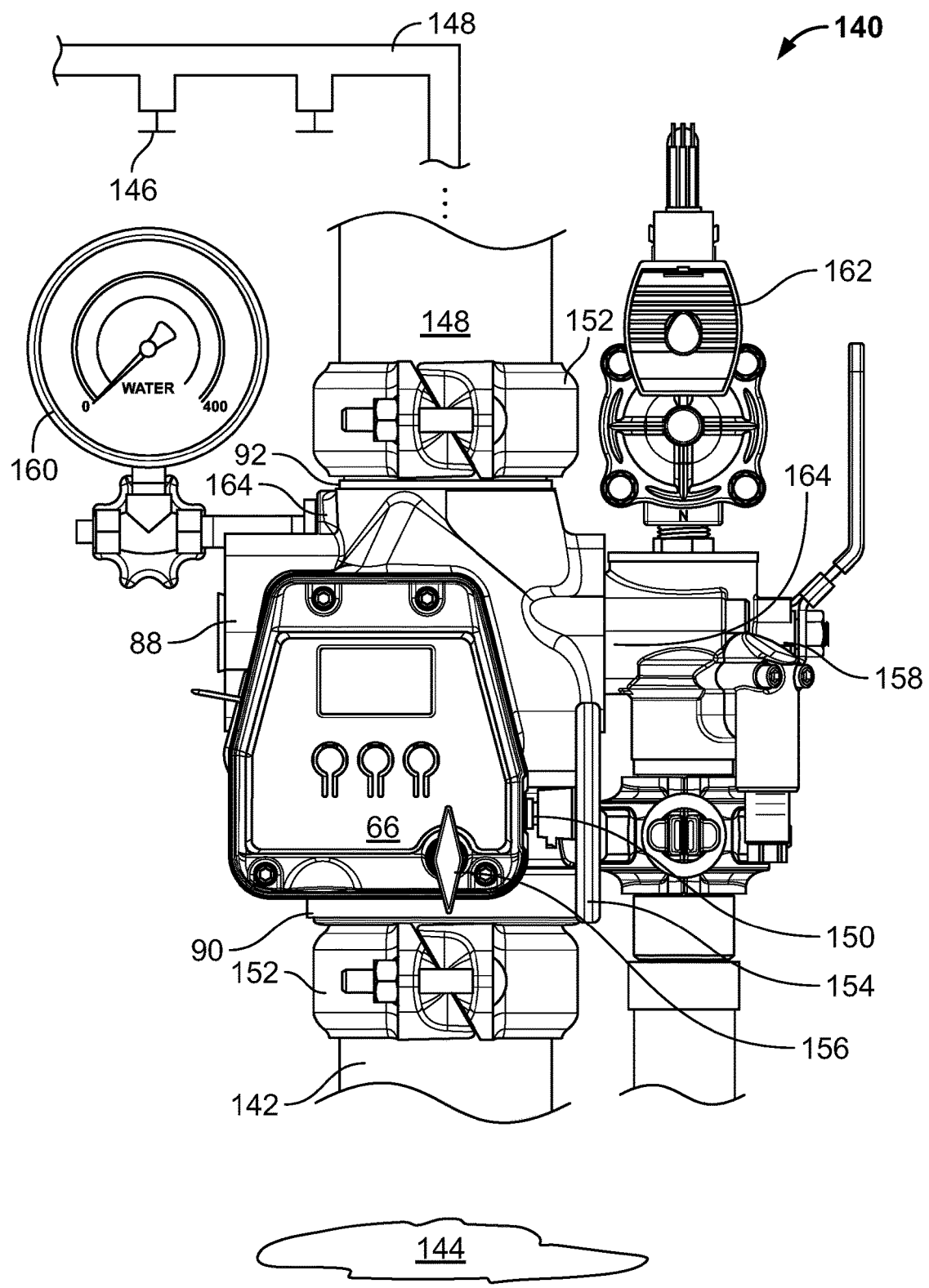

As shown in FIGS. 12 and 13, example valve 86 may be used as a check valve in a fire suppression sprinkler system 140. The example system 140 may be deployed in a structure, such as a warehouse, office building, and a hotel to cite a few examples. As shown in FIG. 12, system 140 comprises a standpipe 142 connectable to a water supply 144 such as the service water supply to the structure. A plurality of fire suppression sprinklers 146 are distributed throughout the structure. A piping network 148 extends throughout the structure and provides fluid communication between the standpipe 142 and the sprinklers 146. Piping network 148 may contain water, as in a wet system, or may be initially filled with air or an inert gas as in a dry system.

Check valve 86 controls fluid flow between the standpipe 142 and the piping network 148. As shown in FIG. 9, the example check valve 86 comprises housing 88 having an inlet 90 connected to the standpipe 142 and an outlet 92 connected to the piping network 148. A seat 94 surrounds the inlet 90. A shaft 96 is rotatably mounted within the housing 88. A valve closing member 100 is positioned within the housing 88 and sealingly engages the seat 94. The valve closing member is mounted on the shaft 96 and is movable relatively thereto between an open position allowing flow from the inlet 90 to the outlet 92, and a closed position preventing reversal of the flow. As shown in FIG. 10, a sensing arm 116 has a first end 118 fixedly mounted on the shaft 96 and a second end portion 122 engaging the valve closing member 100. A spring 124 acts to bias the sensing arm 116 into contact with the valve closing member 100. A sensor system 66 is adapted to sense rotation of the shaft 96 relatively to the housing 88. Further details of the check valve 86 and the sensor system 66 are described above and not repeated here.

When, as shown in FIG. 12, check valve 86 is used in a fire suppression system 140, the system may further comprise a shutoff valve 150 positioned between the check valve 86 and the standpipe 142. Shutoff valve 150 controls fluid flow from the supply 144 to the valve 86 and hence to the piping network 148 and thus may be used to isolate the network to perform test and drain functions. In the example system embodiment 140, shown in FIG. 12, the shutoff valve 150 is a separate, discrete valve coupled to the standpipe 142 and the housing 88, in this example using mechanical couplings 152. Shutoff valve 150 in this example comprises a hand wheel 154 for manually opening and closing the valve, and a valve status indicator 156. In an alternate embodiment, shown in FIG. 13, shutoff valve 150 is positioned within the housing 88 of check valve 86 between the inlet 90 and the valve closing member 100 (not visible).

As shown in FIGS. 12 and 13, the system 140 may further comprise a test and drain valve 158 in fluid communication with the check valve 86 at a position between the valve closing member 100 (not visible) and the check valve outlet 92. Additional equipment, such as a system pressure gage 160 and a pressure valve 162 may also be in fluid communication with the check valve 86 at a position between the valve closing member and the outlet. In this example embodiment, ports 164 are provided in housing 88 to tap the system for fluid communication between the system and the additional equipment. Note that the pressure valve 162 is mounted on and in fluid communication with the test and drain valve 158.

Check valve 86, when used with fire suppression system 140 may detect and measure fluid flow to the system. To perform this detection and measurement function the check valve 86 is calibrated by correlating a known rate of fluid flow with a rotational position of the shaft as described above. In a practical example system, a flow rate range of interest over which check valve may be calibrated to detect a fluid flow ranges from 4 gallons per minute (15 liters/minute) to 10 gallons per minute (38 liters/minute).

Example flow rate sensors as described and claimed are expected to provide greater sensitivity and accuracy than prior art sensors. Valves such as the examples disclosed herein are expected to improve practical fire suppression system design because they avoid the need for a separate flow switch and its concomitant disadvantages, such as loss of pressure head, or the need, in dry systems, for an intermediate chamber and separate pressure switch. Further improvement to robustness of both sensors and valves is also expected through the elimination of paddle switches which are subject to physical damage due to their lightweight construction necessary to detect small flow rates in large diameter pipe. System repair and maintenance may also be improved by isolating the sensor system from the working fluid within the valve or sensor housing, as there would be no need to drain the entire piping network to effect repair or replacement of the sensor system. Because of the sensitivity and accuracy of the sensor the valve may also be used to measure flow rate and distinguish between a leak in the system and a fire condition. The magnitude of the fire may also be judged by measurements of the flow rate.

All of the embodiments of the claimed invention described herein are provided expressly by way of example only. Innumerable variations and modifications may be made to the example embodiments described herein without departing from the concept of this disclosure. Additionally, the scope of this disclosure is intended to encompass any and all modifications and combinations of all elements, features, and aspects described in the specification and claims, and shown in the drawings. Any and all such modifications and combinations are intended to be within the scope of this disclosure.

What is claimed is:

1. A valve, said valve comprising:
a housing having an inlet and an outlet;
a seat surrounding said inlet;
a shaft rotatably mounted within said housing;
a valve closing member positioned within said housing and sealingly engageable with said seat, said valve closing member mounted on said shaft and movable relatively to and independently of said shaft between an open position allowing flow from said inlet to said outlet, and a closed position preventing reversal of said flow;
a sensing arm having a first end fixedly mounted on said shaft and a second end portion engaging said valve closing member; and
a spring acting to bias said sensing arm into contact with said valve closing member;
a sensor system adapted to sense rotation of said shaft relatively to said housing.

2. The valve according to claim 1, wherein said spring acts between said housing and said sensing arm.

3. The valve according to claim 1, further comprising a projection extending from said sensor system into said housing, said spring acting between said projection and said sensing arm.

4. The valve according to claim 3, wherein said projection extending from said sensor system into said housing has an eccentric cross section.

5. The valve according to claim 2, wherein said spring acts to bias said valve closing member into said closed position.

6. The valve according to claim 1, wherein said sensor system is mounted on said housing.

7. The valve according to claim 1, wherein said sensing arm comprises:
a first projection extending from said second end portion;
a second projection extending from said second end and in spaced relation to said first projection, said first and second projections engaging said valve closing member.

8. The valve according to claim 7, wherein said first and second projections are aligned along a line oriented parallel to said shaft.

9. The valve according to claim 1, wherein said valve closing member comprises:
a disk sealingly engageable with said seat;
a first lug projecting from said disk, said first lug defining a first opening receiving said shaft;
a second lug projecting from said disk, said second lug being arranged in spaced relation to said first lug and defining a second opening receiving said shaft, said disk being rotatable about said shaft relatively thereto.

10. The valve according to claim 9, wherein said first and second openings comprise respective first and second slots, said first and second slots being oriented relatively to said disk so as to permit translational motion of said disk toward and away from said seat.

11. The valve according to claim 9, wherein said sensing arm comprises:
a first projection extending from said second end portion;
a second projection extending from said second end portion positioned in spaced relation to said first projection, said first and second projections engaging said valve closing member.

12. The valve according to claim 11, wherein said first and second projections are aligned along a line oriented parallel to said shaft.

13. The valve according to claim 12, wherein said first projection engages said disk on one side of a diametral line of said disk and said second projection engages said disk on an opposite side of said diametral line, said diametral line being oriented perpendicularly to said shaft.

14. The valve according to claim 11, wherein said second end portion of said sensing arm extends in a direction parallel to said shaft and said first and second projections engage said disk at first and second points proximate to a center of said disk.

15. The valve according to claim 14, wherein said first and second points are located over center of said disk relatively to said shaft.

16. The valve according to claim 1, further comprising a magnet fixedly mounted on said shaft, said magnet being positioned proximate to said sensor system.

17. The valve according to claim 16, wherein said magnet is positioned within said housing.

18. The valve according to claim 17, wherein said magnet is mounted on an end of said shaft.

19. The valve according to claim 18, wherein said magnet is surrounded by a non-magnetic sheath projecting from said housing.

20. The valve according to claim 1, wherein said sensor system is positioned on an exterior of said housing.

21. The valve according to claim 1, wherein said sensor system comprises a non-contact sensor.

22. The valve according to claim 1, wherein said sensor system comprises a sensor selected from the group consisting of magnetic sensors, Hall effect sensors and capacitive sensors.

23. The valve according to claim 1, wherein said sensor system comprises a magnetic position sensor.

24. The valve according to claim 23, wherein said sensor system further comprises a controller in communication with said magnetic position sensor.

25. The valve according to claim 22, wherein said sensor system further comprises an adjustable delay circuit in communication with said controller for delaying communication of an alarm signal from said controller.

26. A fire suppression sprinkler system connectable to a water supply, said sprinkler system comprising:
   a standpipe connectable to said water supply;
   a plurality of fire suppression sprinklers;
   a piping network providing fluid communication between said standpipe and said sprinklers;
   a check valve controlling fluid flow between said standpipe and said piping network, said check valve comprising:
   a housing having an inlet connected to said standpipe and an outlet connected to said piping network;
   a seat surrounding said inlet;
   a shaft rotatably mounted within said housing;
   a valve closing member positioned within said housing and sealingly engageable with said seat, said valve closing member mounted on said shaft and movable relatively to and independently of said shaft between an open position allowing flow from said inlet to said outlet, and a closed position preventing reversal of said flow;
   a sensing arm having a first end fixedly mounted on said shaft and a second end portion engaging said valve closing member;
   a spring acting to bias said sensing arm into contact with said valve closing member;
   a sensor system adapted to sense rotation of said shaft relatively to said housing.

27. The system according to claim 26, further comprising a shutoff valve positioned between said check valve and said standpipe for controlling fluid flow to said valve.

28. The system according to claim 26, further comprising a shutoff valve positioned within said housing between said inlet and said valve closing member.

29. The system according to claim 26, wherein said check valve is calibrated by correlating a known rate of fluid flow with a rotational position of said shaft.

30. The system according to claim 29, wherein said check valve is calibrated to detect a fluid flow range from 4 gallons per minute (15 liters/minute) to 10 gallons per minute (38 liters/minute).

31. The system according to claim 26, further comprising a test and drain valve in fluid communication with said check valve at a position between said valve closing member and said outlet.

32. The system according to claim 26, further comprising a pressure gage in fluid communication with said check valve at a position between said valve closing member and said outlet.

33. The system according to claim 26, further comprising a pressure valve in fluid communication with said check valve at a position between said valve closing member and said outlet.

* * * * *